United States Patent
Kim et al.

(10) Patent No.: US 12,537,842 B2
(45) Date of Patent: Jan. 27, 2026

(54) SIGNAL PROCESSING DEVICE AND VEHICLE COMMUNICATION DEVICE INCLUDING THE SAME

(71) Applicant: LG ELECTRONICS INC., Seoul (KR)

(72) Inventors: Taekyoung Kim, Seoul (KR); Sehoon Jang, Seoul (KR); Chaeguk Cho, Seoul (KR); Changhun Sung, Seoul (KR); Hansung Kim, Seoul (KR); Younggon Kim, Seoul (KR); Jooyoung Choi, Seoul (KR); Junsang Park, Seoul (KR); Youngjae Kim, Seoul (KR); Jaejin Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 18/575,613

(22) PCT Filed: Jun. 30, 2022

(86) PCT No.: PCT/KR2022/009470
§ 371 (c)(1),
(2) Date: Dec. 29, 2023

(87) PCT Pub. No.: WO2023/277632
PCT Pub. Date: Jan. 5, 2023

(65) Prior Publication Data
US 2024/0380817 A1   Nov. 14, 2024

(30) Foreign Application Priority Data
Jul. 1, 2021 (KR) .......... 10-2021-0086549

(51) Int. Cl.
*H04L 9/40*   (2022.01)
*B60R 16/023*   (2006.01)
(Continued)

(52) U.S. Cl.
CPC ........ *H04L 63/1425* (2013.01); *B60R 16/023* (2013.01); *G06F 9/45558* (2013.01);
(Continued)

(58) Field of Classification Search
CPC ..... H04L 63/1425; H04L 12/66; H04L 41/08; H04L 41/084; H04L 41/5054;
(Continued)

(56) References Cited

U.S. PATENT DOCUMENTS 11,816,057 B2 * 11/2023 Saxena .............. G06F 13/4072
2005/0216770 A1    9/2005 Rowett et al.
(Continued)

FOREIGN PATENT DOCUMENTS

EP    3 402 172 A1    11/2018
EP    3 745 271 A1    12/2020
(Continued)

OTHER PUBLICATIONS

Kiran K N et al., Dpdk Contrail: "Day One: Contrail DPDK vRouter", URL: https://www.juniper.net/documentation/en_US/day-one-books/contrail-DPDK.pdf, Jan. 1, 2021, XP093090925, 196 pages total.
(Continued)

*Primary Examiner* — Quan Zhen Wang
*Assistant Examiner* — Rajsheed O Black-Childress
(74) *Attorney, Agent, or Firm* — Birch, Stewart, Kolasch & Birch, LLP

(57) ABSTRACT

A signal processing device and a vehicle communication device including the same are disclosed. The signal processing device according to an embodiment of the present disclosure includes: a processor configured to receive network data from an external source and to process the received network data; and a shared memory configured to store data received from the processor, wherein the proces-
(Continued)

sor is configured to execute a network switch on a container engine, and in response to a request for transmission of the network data from an executed container, transmit the network data through a first path based on the network switch and the shared memory, or transmit the network data through a second path based on an interface in the container. Accordingly, network data processing performance may be improved.

18 Claims, 20 Drawing Sheets

(51) Int. Cl.

| | | |
|---|---|---|
| *G06F 9/455* | (2018.01) | |
| *G06F 9/54* | (2006.01) | |
| *H04L 12/40* | (2006.01) | |
| *H04L 12/66* | (2006.01) | |
| *H04L 41/08* | (2022.01) | |
| *H04L 41/084* | (2022.01) | |
| *H04L 41/5054* | (2022.01) | |
| *H04L 67/12* | (2022.01) | |
| *H04W 4/40* | (2018.01) | |
| *H04W 4/48* | (2018.01) | |
| *H04W 12/40* | (2021.01) | |

(52) U.S. Cl.
CPC .............. *G06F 9/544* (2013.01); *G06F 9/546* (2013.01); *H04L 12/66* (2013.01); *H04L 41/08* (2013.01); *H04L 41/084* (2013.01); *H04L 41/5054* (2013.01); *H04L 67/12* (2013.01); *H04W 4/40* (2018.02); *H04W 4/48* (2018.02); *H04W 12/40* (2021.01); *G06F 2009/45595* (2013.01); *H04L 2012/40215* (2013.01); *H04L 2012/40273* (2013.01)

(58) Field of Classification Search
CPC ........... H04L 67/12; H04L 2012/40215; H04L 2012/40273; H04L 12/40013; H04L 63/1441; H04L 47/28; H04L 67/34; H04L 45/76; H04L 41/5058; H04L 69/18; B60R 16/023; G06F 9/45558; G06F 9/544; G06F 9/546; G06F 2009/45595; G06F 9/455; H04W 4/40; H04W 4/48; H04W 12/40; H04W 88/10
See application file for complete search history.

(56) References Cited

U.S. PATENT DOCUMENTS

| | | |
|---|---|---|
| 2009/0193057 A1 | 7/2009 | Maes |
| 2013/0070773 A1 | 3/2013 | Lee et al. |
| 2017/0099195 A1 | 4/2017 | Raney |
| 2017/0371698 A1 | 12/2017 | Paolino et al. |
| 2019/0156650 A1 | 5/2019 | Takagi |
| 2019/0199537 A1 | 6/2019 | Seo et al. |
| 2019/0268420 A1 | 8/2019 | Acharya et al. |
| 2020/0143053 A1 | 5/2020 | Gutierrez et al. |
| 2020/0183732 A1 | 6/2020 | Comett et al. |
| 2020/0186560 A1 | 6/2020 | Ben-Noon et al. |
| 2020/0285779 A1 | 9/2020 | Foltin et al. |
| 2021/0152605 A1 | 5/2021 | Mizrahi |

FOREIGN PATENT DOCUMENTS

| | | |
|---|---|---|
| JP | 2017-112590 A | 6/2017 |
| KR | 10-2004-0041718 A | 5/2004 |
| KR | 10-2009-0092370 A | 9/2009 |
| KR | 10-2010-0111225 A | 10/2010 |
| KR | 10-1159377 B1 | 6/2012 |
| KR | 10-1206894 B1 | 11/2012 |
| KR | 10-2013-0068631 A | 6/2013 |
| KR | 10-1446525 B1 | 10/2014 |
| KR | 10-1612825 B1 | 4/2016 |
| KR | 10-2017-0099701 A | 9/2017 |
| KR | 10-2020-0140542 A | 12/2020 |
| KR | 10-2244569 B1 | 4/2021 |
| WO | WO 2015/103376 A1 | 7/2015 |

OTHER PUBLICATIONS

García-Sánchez et al., "Deploying intelligent e-Health services in a mobile gateway," Expert Systems with Applications, Aug. 1, 2012, pp. 1-18 (20 pages total).
Sim et al., "Service-Oriented Gateway: Connecting Automotive Ethernet and Cloud for Efficient Development of Connected Car Services," IEEE Standards Association (IEEE SA), 2020, 23 pages total.
De Vos, "Integration of wireless sensor networks with a service-oriented architecture," TU/e, Eindhoven University of Technology, May 2009, pp. 1-102 (105 pages total).
Banks et al., "MQTT Version 5.0 Oasis Standard Mar. 7, 2019 Specification URIs", Mar. 7, 2019 pp. 1-137, XP055902412, Retrieved from the Internet: URL: https://docs.oasis-open.org/mqtt/mqtt/v5.0/os/mqtt-v5.0-os.pdf.
Chisnall, "The Definitive Guide to the Xen Hypervisor", Jan. 1, 2008, XP055728173, ISBN: 978-0-13-234971-0, Retrieved from the Internet: URL: https://www.mobt3ath.com/uplode/book/book-55475.pdf.

\* cited by examiner

SIGNAL PROCESSING DEVICE AND VEHICLE COMMUNICATION DEVICE INCLUDING THE SAME

CROSS REFERENCE TO RELATED APPLICATIONS

This application is the National Phase of PCT International Application No. PCT/KR2022/009470, filed on Jun. 30, 2022, which claims priority under 35 U.S.C. 119 (a) to Patent Application No. 10-2021-0086549, filed in the Republic of Korea on Jul. 1, 2021, all of which are hereby expressly incorporated by reference into the present application.

BACKGROUND

1. Technical Field

The present disclosure relates to a signal processing device and a vehicle communication device including the same, and more particularly to a signal processing device capable of improving network data processing performance, and a vehicle communication device including the signal processing device.

2. Description of the Related Art

A vehicle is a machine that allows a user to move in a desired direction. A representative example of the vehicle is a car.

Meanwhile, a vehicle communication device is mounted in the vehicle for user convenience.

Particularly, a gateway which is a high-speed router may be used for data communication between a plurality of in-vehicle processors.

U.S. patent Ser. No. 10/904,167 (hereinafter referred to as "related art") discloses incoming packet processing for a computer system which includes receiving a packet to be routed via a virtual machine, and determining, by a hypervisor using a classifier, whether the packet is to be passed to a network stack for packet processing.

However, the related art has a problem in that it is required to allocate separate queues for each virtual machine, such that additional overhead is incurred during network packet processing, and network setup is required separately for each virtual machine.

SUMMARY

It is an object of the present disclosure to provide a signal processing device capable of improving network data processing performance, and a vehicle communication device including the signal processing device.

Meanwhile, it is another object of the present disclosure to provide a signal processing device capable of processing network data differently for each path, and a vehicle communication device including the signal processing device.

Meanwhile, it is yet another object of the present disclosure to provide a signal processing device capable of rapidly processing specific network data, and a vehicle communication device including the signal processing device.

Meanwhile, it is further another object of the present disclosure to provide a signal processing device capable of reducing latency and performing high-speed data transmission during inter-processor communication, and a vehicle communication device including the signal processing device.

In accordance with an aspect of the present disclosure, the above and other objects can be accomplished by providing a signal processing device and a vehicle communication device including the same, which include: a processor configured to receive network data from an external source and to process the received network data; and a shared memory configured to store data received from the processor, wherein the processor is configured to execute a network switch on a container engine, and in response to a request for transmission of the network data from an executed container, transmit the network data through a first path based on the network switch and the shared memory, or transmit the network data through a second path based on an interface in the container.

Meanwhile, the processor may be configured to: execute a kernel and execute a container engine on the kernel; execute the network switch on the container engine; receive the network data based on Ethernet communication; and in response to a request for transmission of the network data from the container executed on the container engine or the kernel, transmit the network data through the first path based on the network switch and the shared memory, or transmit the network data through the second path based on the kernel and an Ethernet interface in the container.

Meanwhile, in response to a request for transmission of the network data from the container based on the first path, the processor may be configured to set up the first path based on the network switch and the shared memory by updating.

Meanwhile, during monitoring of transmission of the network data through the second path, in response to an amount of the transmitted network data being greater than or equal to an allowable value, the processor may be configured to transmit the network data through the first path.

Meanwhile, the processor may be configured to: in response to a request for transmission of a first network data from a first application or a first container to operate for driving a first display, transmit the first network data through the second path; and in response to a request for transmission of a second network data from a second application or a second container to operate for driving a second display, transmit the second network data through the first path.

Meanwhile, a resolution of the second display may be greater than a resolution of the first display, or a resolution of the second network data may be greater than a resolution of the first network data.

Meanwhile, in response to a data amount of the network data increasing to a reference value or higher during transmission of the network data through the second path, the processor may be configured to transmit the network data through the first path.

Meanwhile, in response to a network address of the network data being changed during transmission of the network data through the second path, the processor may be configured to transmit the network data through the first path.

Meanwhile, the kernel may be configured to execute a physical driver to receive the network data from a network interface, transmit the network data, received by the physical driver, to the network switch based on the first path, or transmit the network data, received by the physical driver, to the Ethernet interface in the container via a bridge, an IP, a net filter, and an Ethernet interface based on the second path.

Meanwhile, the kernel may be configured to execute a physical driver to receive the network data from a network interface, transmit the network data, received by the physical driver, to the network switch based on the first path, or transmit the network data, received by the physical driver, to the Ethernet interface in the container via a socket buffer, a traffic control, a bridge, an IP, a net filter, and an Ethernet interface based on the second path.

Meanwhile, during transmission of first data from the first container to the second container, the kernel may be configured to: transmit the first data by using the shared memory through the first path; or receive the first data from a first Ethernet interface through the second path, and transmit the first data to the second container via the bridge, the IP, the net filter, and the Ethernet interface, without passing through the physical driver, the socket buffer, and the traffic control.

Meanwhile, the signal processing device may further include a second processor configured to receive an in-vehicle sensor signal based on CAN communication, wherein the processor may be configured to receive the network data based on the Ethernet communication, and perform inter-processor communication for communication between the processor and the second processor.

Meanwhile, the shared memory may be configured to operate for message transmission between the processor and the second processor.

According to another embodiment of the present disclosure, a signal processing device and a vehicle communication device including the same include: a processor configured to receive network data from an external source and to process the received network data; and a shared memory configured to store data received from the processor, wherein the processor is configured to: execute a hypervisor and execute a network switch on the hypervisor, and in response to a request for transmission of the network data from a virtual machine executed on the hypervisor, transmit the network data to the virtual machine through a path based on the network switch and the shared memory.

Meanwhile, during transmission of the network data to the virtual machine, the network switch may control the hypervisor to pass through.

Meanwhile, the processor may be configured to further execute a physical driver to receive the network data from a network interface, wherein the processor may be configured to transmit the network data to the virtual machine via the physical driver, the network switch, and the shared memory.

Meanwhile, the physical driver may be configured to send a notification about the network data to drivers in the virtual machines by using an interrupt signal.

Meanwhile, the processor may be configured to: in response to a request for transmission of first network data from a first virtual machine to operate for driving a first display, transmit the first network data having a first resolution; and in response to a request for transmission of a second network data from a second virtual machine to operate for driving a second display, transmit the second network data having a second resolution.

According to yet another embodiment of the present disclosure, a signal processing device and a vehicle communication device including the same include: a processor configured to receive network data from an external source and to process the received network data; and a shared memory configured to store data received from the processor, wherein the processor is configured to execute a network switch, and in response to a request for transmission of the network data from an application executed on an operating system or a hypervisor, transmit the network data to the application through a path based on the network switch and the shared memory.

According to still another embodiment of the present disclosure, a signal processing device and a vehicle communication device including the same include: a processor configured to receive network data from an external source and to process the received network data; and a shared memory configured to store data received from the processor, wherein the processor is configured to execute a kernel and execute a network switch and an application on the kernel, and in response to a request for transmission of the network data from the application, transmit the network data to the application through a path based on the network switch and the shared memory.

Effects of the Disclosure

According to an embodiment of the present disclosure, a signal processing device and a vehicle communication device including the same include: a processor configured to receive network data from an external source and to process the received network data; and a shared memory configured to store data received from the processor, wherein the processor is configured to execute a network switch on a container engine, and in response to a request for transmission of the network data from an executed container, transmit the network data through a first path based on the network switch and the shared memory, or transmit the network data through a second path based on an interface in the container. Accordingly, network data processing performance may be improved. Further, specific network data may be rapidly processed and transmitted.

Meanwhile, the processor may be configured to: execute a kernel and execute a container engine on the kernel; execute the network switch on the container engine; receive the network data based on Ethernet communication; and in response to a request for transmission of the network data from the container executed on the container engine or the kernel, transmit the network data through the first path based on the network switch and the shared memory, or transmit the network data through the second path based on the kernel and an Ethernet interface in the container. Accordingly, network data processing performance may be improved. Further, specific network data may be rapidly processed and transmitted.

Meanwhile, in response to a request for transmission of the network data from the container based on the first path, the processor may be configured to set up the first path based on the network switch and the shared memory by updating. Accordingly, network data processing performance may be improved. Particularly, network data processing performance may be dynamically improved through updating.

Meanwhile, during monitoring of transmission of the network data through the second path, in response to an amount of the transmitted network data being greater than or equal to an allowable value, the processor may be configured to transmit the network data through the first path. Accordingly, network data processing performance may be improved. Particularly, network data processing performance may be improved when the amount of the transmitted network data is greater than or equal to the allowable value.

Meanwhile, the processor may be configured to: in response to a request for transmission of a first network data from a first application or a first container to operate for driving a first display, transmit the first network data through the second path; and in response to a request for transmission of a second network data from a second application or a second container to operate for driving a second display, transmit the second network data through the first path.

Accordingly, network data processing performance may be improved. Particularly, network data processing performance may be improved by processing the network data using different paths for each display.

Meanwhile, a resolution of the second display may be greater than a resolution of the first display, or a resolution of the second network data may be greater than a resolution of the first network data. Accordingly, high-resolution network data processing performance may be improved.

Meanwhile, in response to a data amount of the network data increasing to a reference value or higher during transmission of the network data through the second path, the processor may be configured to transmit the network data through the first path. Accordingly, network data processing performance may be improved when the data amount of the network data is greater than or equal to the reference value.

Meanwhile, in response to a network address of the network data being changed during transmission of the network data through the second path, the processor may be configured to transmit the network data through the first path. Accordingly, network data processing performance may be improved when the network address of the network data is changed.

Meanwhile, the kernel may be configured to execute a physical driver to receive the network data from a network interface, transmit the network data, received by the physical driver, to the network switch based on the first path, or transmit the network data, received by the physical driver, to the Ethernet interface in the container via a bridge, an IP, a net filter, and an Ethernet interface based on the second path. Accordingly, the network data may be processed differently for each path.

Meanwhile, the kernel may be configured to execute a physical driver to receive the network data from a network interface, transmit the network data, received by the physical driver, to the network switch based on the first path, or transmit the network data, received by the physical driver, to the Ethernet interface in the container via a socket buffer, a traffic control, a bridge, an IP, a net filter, and an Ethernet interface based on the second path. Accordingly, the network data may be processed differently for each path.

Meanwhile, during transmission of first data from the first container to the second container, the kernel may be configured to: transmit the first data by using the shared memory through the first path; or receive the first data from a first Ethernet interface through the second path, and transmit the first data to the second container via the bridge, the IP, the net filter, and the Ethernet interface, without passing through the physical driver, the socket buffer, and the traffic control. Accordingly, network data processing performance may be improved. Particularly, network data may be efficiently transmitted between the containers.

Meanwhile, the signal processing device may further include a second processor configured to receive an in-vehicle sensor signal based on CAN communication, wherein the processor may be configured to receive the network data based on the Ethernet communication, and perform inter-processor communication for communication between the processor and the second processor. As described above, by performing inter-processor communication using the shared memory during communication between the plurality of processors, latency may be reduced and high-speed data transmission may be performed during the inter-processor communication.

Meanwhile, the shared memory may be configured to operate for message transmission between the processor and the second processor. Accordingly, latency may be reduced and high-speed data transmission may be performed during the inter-processor communication.

According to another embodiment of the present disclosure, a signal processing device and a vehicle communication device including the same include: a processor configured to receive network data from an external source and to process the received network data; and a shared memory configured to store data received from the processor, wherein the processor is configured to: execute a hypervisor and execute a network switch on the hypervisor, and in response to a request for transmission of the network data from a virtual machine executed on the hypervisor, transmit the network data to the virtual machine through a path based on the network switch and the shared memory. Accordingly, network data processing performance may be improved. Particularly, network data may be efficiently transmitted to virtual machines.

Meanwhile, during transmission of the network data to the virtual machine, the network switch may control the hypervisor to pass through. Accordingly, network data processing performance may be improved.

Meanwhile, the processor may be configured to further execute a physical driver to receive the network data from a network interface, wherein the processor may be configured to transmit the network data to the virtual machine via the physical driver, the network switch, and the shared memory. Accordingly, network data processing performance may be improved.

Meanwhile, the physical driver may be configured to send a notification about the network data to drivers in the virtual machines by using an interrupt signal. Accordingly, network data processing performance may be improved.

Meanwhile, the processor may be configured to: in response to a request for transmission of first network data from a first virtual machine to operate for driving a first display, transmit the first network data having a first resolution; and in response to a request for transmission of a second network data from a second virtual machine to operate for driving a second display, transmit the second network data having a second resolution. Accordingly, network data processing performance may be improved by transmitting the network data differently for each resolution.

According to yet another embodiment of the present disclosure, a signal processing device and a vehicle communication device including the same include: a processor configured to receive network data from an external source and to process the received network data; and a shared memory configured to store data received from the processor, wherein the processor is configured to execute a network switch, and in response to a request for transmission of the network data from an application executed on an operating system or a hypervisor, transmit the network data to the application through a path based on the network switch and the shared memory. Accordingly, network data processing performance may be improved. Further, specific network data may be rapidly processed and transmitted.

According to still another embodiment of the present disclosure, a signal processing device and a vehicle communication device including the same include: a processor configured to receive network data from an external source and to process the received network data; and a shared memory configured to store data received from the processor, wherein the processor is configured to execute a kernel and execute a network switch and an application on the kernel, and in response to a request for transmission of the network data from the application, transmit the network data to the application through a path based on the network switch and the shared memory. Accordingly, network data processing performance may be improved. Further, specific network data may be rapidly processed and transmitted.

DETAILED DESCRIPTION

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1:
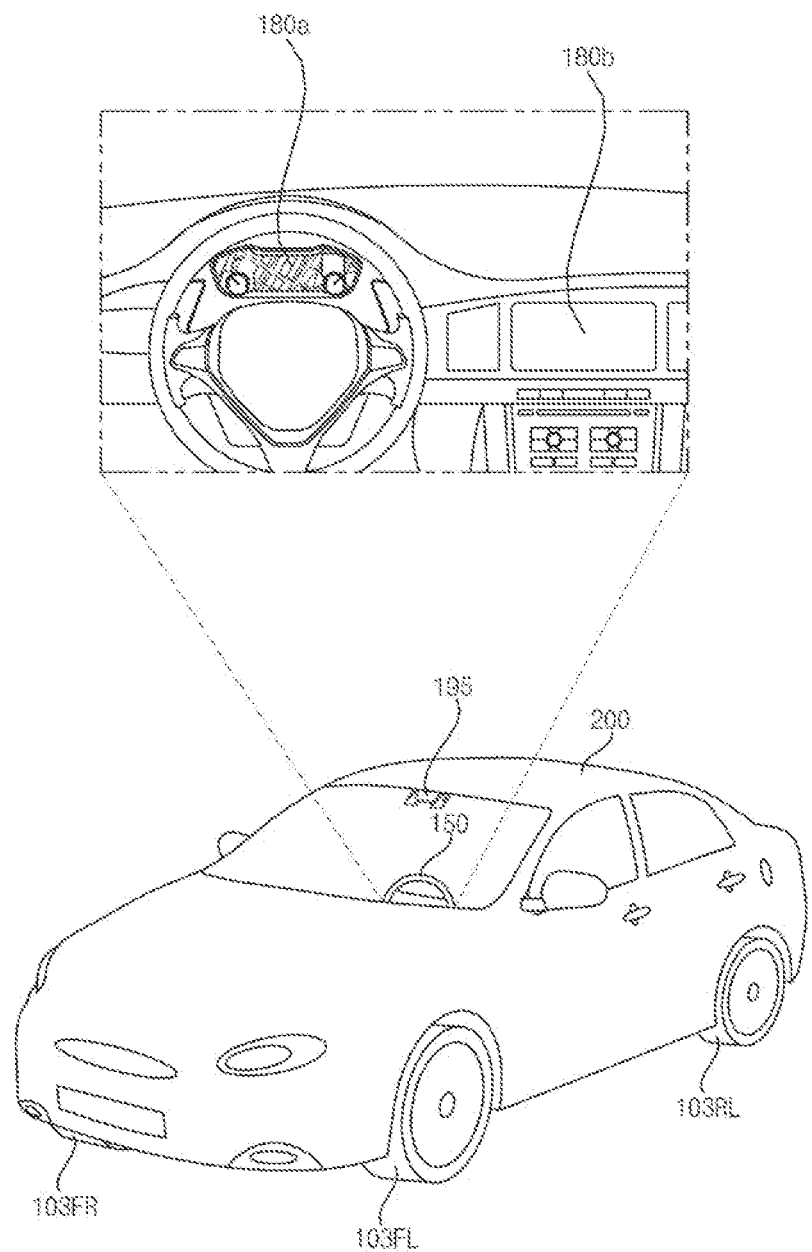
FIG. 1 is a view showing an example of the exterior and interior of a vehicle.

FIG. 1 is a view showing an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180a and 180b configured to display images and information.

In FIG. 1, a cluster display 180a and an audio video navigation (AVN) display 180b are illustrated as the plurality of displays 180a and 180b. In addition, a head up display (HUD) may also be used.

Meanwhile, the audio video navigation (AVN) display 180b may also be called a center information display.

Meanwhile, according to the embodiment of the present disclosure, in a vehicle display apparatus 100 including a plurality of displays 180a and 180b, the plurality of displays 180a and 180b may display the same images in a synchronized state.

In particular, a signal processing device 170 in the vehicle display apparatus 100 may transmit the same data to a plurality of virtual machines in a synchronized state, and may be configured to display the same images on the displays.

Meanwhile, the vehicle 200 described in this specification may be a concept including all of a vehicle having an engine as a power source, a hybrid vehicle having an engine and an electric motor as a power source, and an electric vehicle having an electric motor as a power source.

Figure 2A:
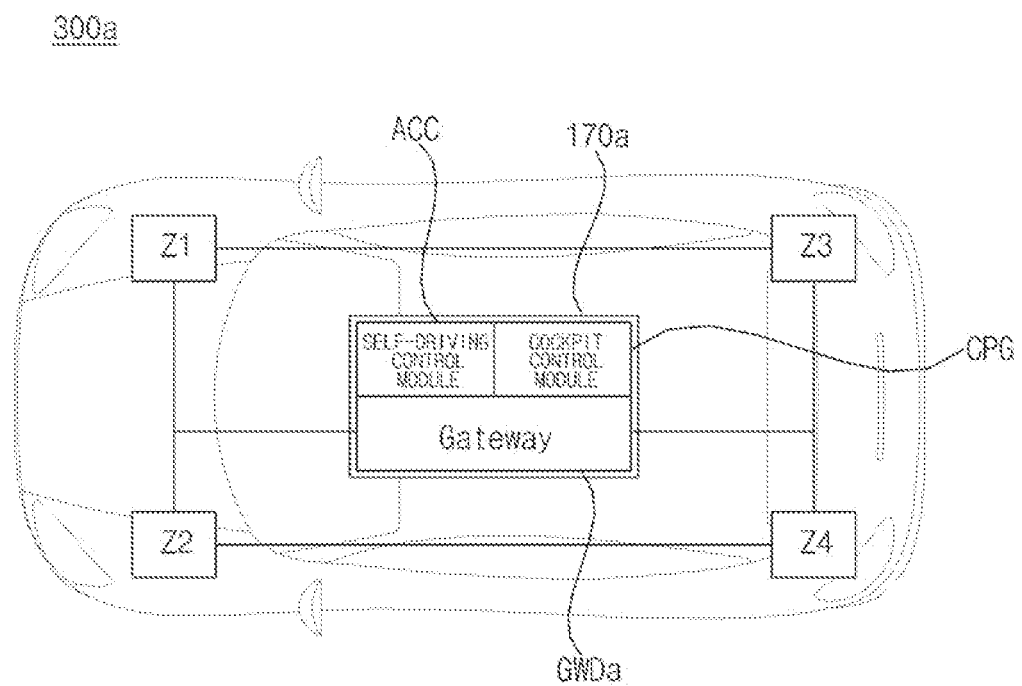
FIGS. 2A to 2C are diagrams illustrating various architectures of a vehicle communication gateway according to an embodiment of the present disclosure.
Figure 2B:
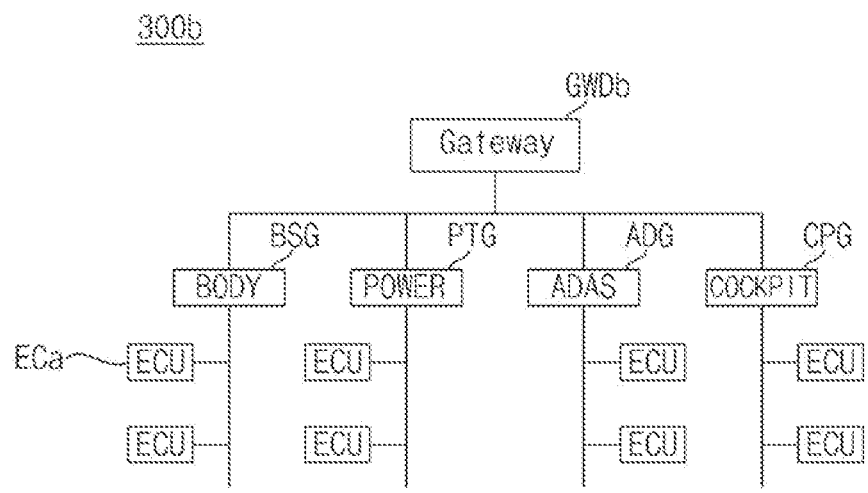
Figure 2C:
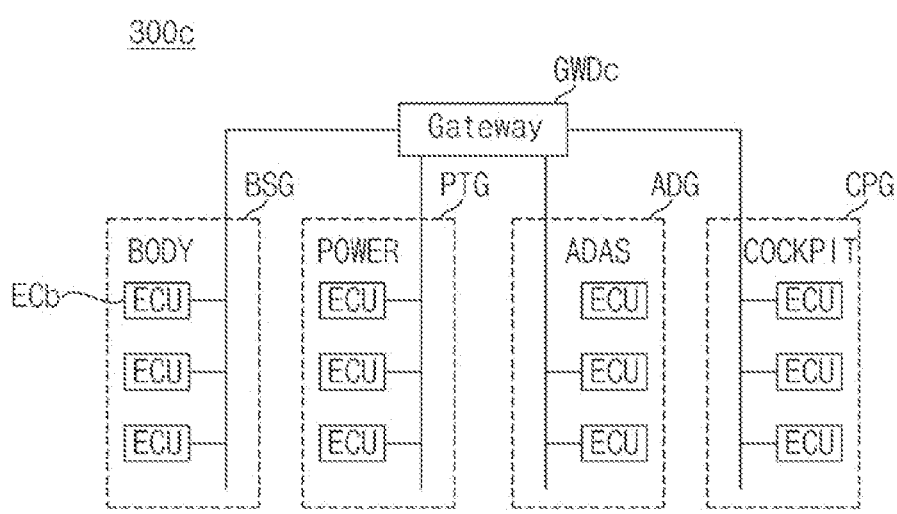

FIGS. 2A to 2C are diagrams illustrating various architectures of a vehicle communication gateway according to an embodiment of the present disclosure.

First, FIG. 2A is a diagram illustrating a first architecture of a vehicle communication gateway according to an embodiment of the present disclosure.

Referring to the drawing, the first architecture 300a may correspond to a zone-based architecture.

Accordingly, in-vehicle sensor devices and processors may be mounted in each of a plurality of zones Z1 to Z4, and a signal processing device 170a including a vehicle communication gateway GWDa may be disposed at the center of the plurality of zones Z1 to Z4.

Meanwhile, the signal processing device 170a may further include a self-driving control module ACC, a cockpit control module CPG, etc., in addition to the vehicle communication gateway GWDa.

The vehicle communication gateway GWDa in the signal processing device 170a may be a High Performance Computing (HPC) gateway.

That is, as an integrated HPC gateway, the signal processing device 170a of FIG. 2A may exchange data with an external communication module (not shown) or processors (not shown) in the plurality of zones Z1 to Z4.

FIG. 2B is a diagram illustrating a second architecture of a vehicle communication gateway according to an embodiment of the present disclosure.

Referring to the drawing, a second architecture 300b may correspond to a domain integrated architecture.

Accordingly, a body chassis control module (BSG), a power control module (PTG), an ADAS control module (ADG), and a cockpit control module (CPG) are connected in parallel to a gateway GWDb, and a plurality of processors ECU may be electrically connected to the respective modules BSG, PTG, ADG, and CPG.

Meanwhile, the respective processors ECU may be connected to the gateway GWDb while being integrated therein.

Meanwhile, the signal processing device 170 including the gateway GWDb of FIG. 2B may function as a domain integrated signal processing device.

FIG. 2C is a diagram illustrating a third architecture of a vehicle communication gateway according to an embodiment of the present disclosure.

Referring to the drawing, a third architecture 300c may correspond to a distributed architecture.

Accordingly, the body chassis control module (BSG), the power control module (PTG), the ADAS control module (ADG), and the cockpit control module (CPG) are connected in parallel to a gateway GWDc, and particularly a plurality of processors ECU in the respective control modules may be electrically connected in parallel to the gateway GWDc.

Upon comparison with FIG. 2B, the third architecture has a difference in that the respective processors ECU are connected directly to the gateway GWDc without being connected to another module.

Meanwhile, the signal processing device 170 including the gateway GWDc of FIG. 2C functions as a distributed signal processing device.

Figure 3:
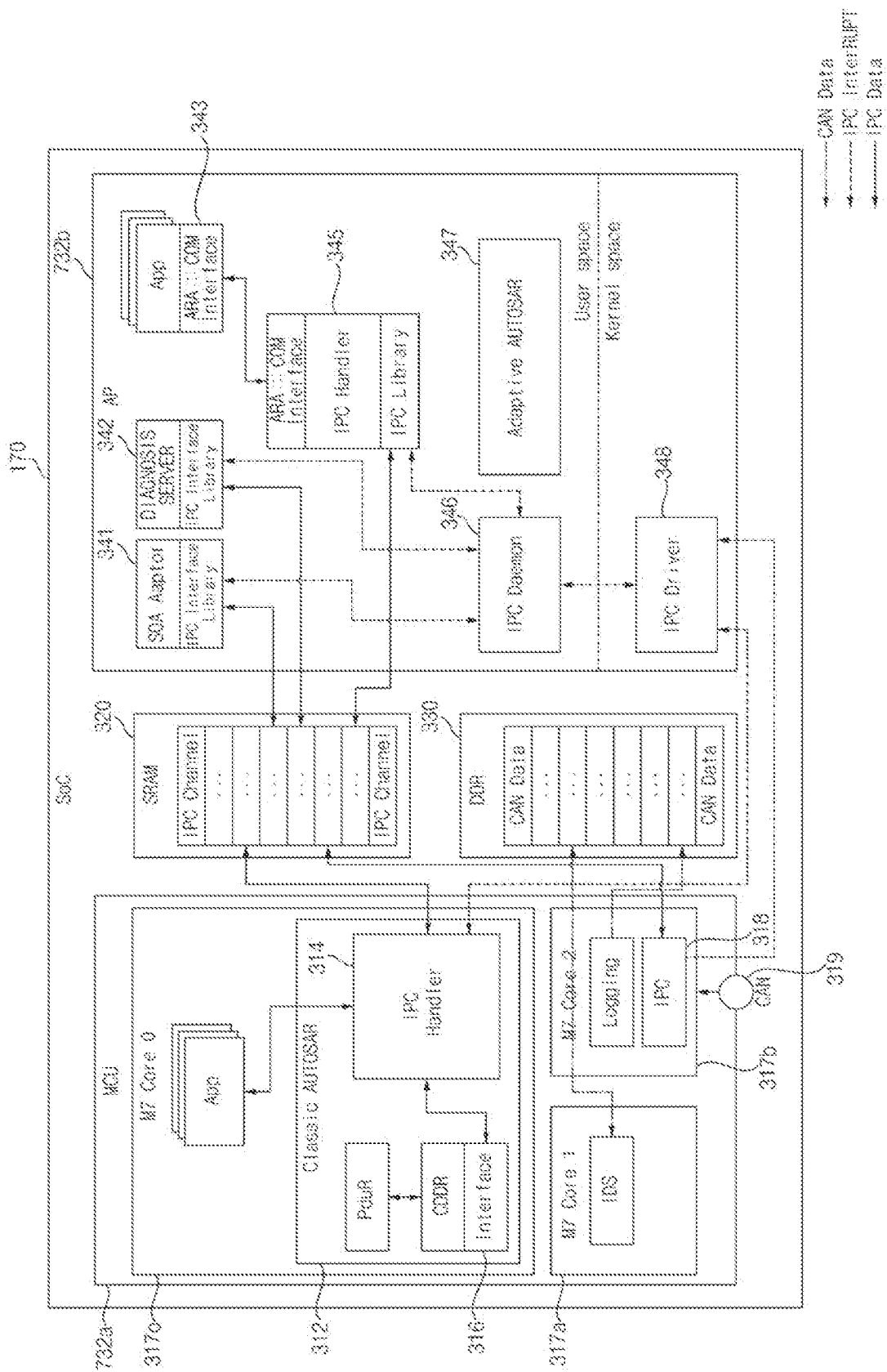
FIG. 3 is an internal block diagram illustrating a signal processing device according to an embodiment of the present disclosure.

FIG. 3 is an internal block diagram illustrating a signal processing device according to an embodiment of the present disclosure.

Referring to the drawing, the signal processing device 170 according to an embodiment of the present disclosure includes: a first processor 732a, which based on a first communication scheme, is configured to receive a first message including a sensor signal in a vehicle and to perform signal processing on the received first message; and a second processor 732b, which based a second communication scheme, is configured to receive a second message including a communication message received from an external source and to perform signal processing of the received second message.

In this case, the second communication scheme may have a faster communication speed or a wider bandwidth than the first communication scheme.

For example, the second communication scheme may be Ethernet communication, and the first communication scheme may be CAN communication. Accordingly, the first message may be a CAN message, and the second message may be an Ethernet message.

Meanwhile, the signal processing device 170 according to an embodiment of the present disclosure further includes: a first memory 320 having an IPC channel; and a second memory 330 storing sensor data including vehicle speed data.

For example, the first memory 320 may be a Static RAM (SRAM), and the second memory 330 may be a DDR memory. Particularly, the second memory 330 may be a Double data rate synchronous dynamic random access memory (DDR SDRAM).

Meanwhile, the signal processing device 170 according to an embodiment of the present disclosure includes a shared memory 508 to operate for transmitting the first message or the second message between the first processor 732a and the second processor 732b.

As described above, by performing inter-processor communication using the shared memory 508 during the communication between the first processor 732a and the second processor 732b, latency may be reduced and high-speed data transmission may be performed during inter-processor communication.

Meanwhile, it is desired that the shared memory 508 is provided in the first memory 320. Accordingly, latency may be reduced and high-speed data transmission may be performed during inter-processor communication.

Meanwhile, the first processor 732a may include a plurality of processor cores 317o, 317a, and 317b disposed therein.

Meanwhile, the first processor 732a may further include an interface 319 for receiving the CAN message from external vehicle sensors.

For example, a first processor core 317o included in the first processor 732a may execute a plurality of applications or may execute a first AUTomotive Open System Architecture (AUTOSAR) 312.

Particularly, by executing a second AUTOSAR 312, the first processor core 317o may execute an inter-processor communication (IPC) handler 314.

Meanwhile, the IPC handler 314 may exchange data with the first memory 320 or may exchange IPC data with an application executed on the core 317o.

Meanwhile, the IPC handler 314 may exchange an interrupt signal with an IPC driver 348 included in the second processor 732b.

Meanwhile, a second processor core 317a included in the first processor 732a may execute IDS and may receive CAN data from the second memory 330.

Meanwhile, a third core 317b included in the first processor 732a may execute Logging, and may store the CAN data, received through the interface 319, in the second memory 330.

Meanwhile, the third processor core 317b included in the first processor 732a may execute an IPC module 318 to exchange IPC data with the first memory 320.

Meanwhile, the third processor core 317b included in the first processor 732a may transmit an interrupt signal to the IPC driver 348 in the second processor 732b.

The first memory 320 may exchange the IPC data with the IPC handler 314 or the IPC module 318.

Meanwhile, the second processor 732b may execute an application 343, the IPC handler 345, an IPC daemon 346, the IPC driver 348, and the like.

Meanwhile, the second processor 732b may further execute a service oriented architecture (SOA) adapter 341, a diagnosis server 342, and the second AUTOSAR 347.

The second AUTOSAR 347 may be an adaptive AUTOSAR, and the first AUTOSAR 312 may be a classic AUTOSAR.

The IPC daemon 346 may exchange an interrupt signal with the SOA adapter 341, the diagnosis server 342, the IPC handler 345, the IPC driver 348, and the like.

Meanwhile, the first memory 320 may exchange IPC data with the SOA adapter 341, the diagnosis server 342, the IPC handler 345, and the like.

Meanwhile, the IPC data described with reference to FIG. 3 may be the CAN message or Ethernet message.

Meanwhile, the IPC handler 345 may function as a service provider providing data such as diagnosis, firmware, upgrade, system information, etc., based on the second AUTOSAR 347.

Meanwhile, although not illustrated in FIG. 3, the first processor 732a implements a message router (not shown), and the message router may convert a frame of the first message, such as the CAN message, into a frame format of the second message, such as the Ethernet message, and may transmit the converted message to the second processor 732b.

Meanwhile, although not illustrated in FIG. 3, the first processor 732a may further implement a CAN driver (not shown) and a CAN interface (not shown).

For example, the CAN interface (not shown) may be implemented by a total of 16 channels, with eight channels of each of a fourth processor core (not shown) and a fifth processor core (not shown) in the first processor 732a.

In this case, a first CAN interface (not shown) implemented on the fourth processor core (not shown) may correspond to a first queue (PTb) during inter-processor communication, and a second CAN interface (not shown)

implemented on the fifth processor core (not shown) may correspond to a second queue (PTb), having a higher priority than the first queue (PTb), during inter-processor communication.

Figure 4A:
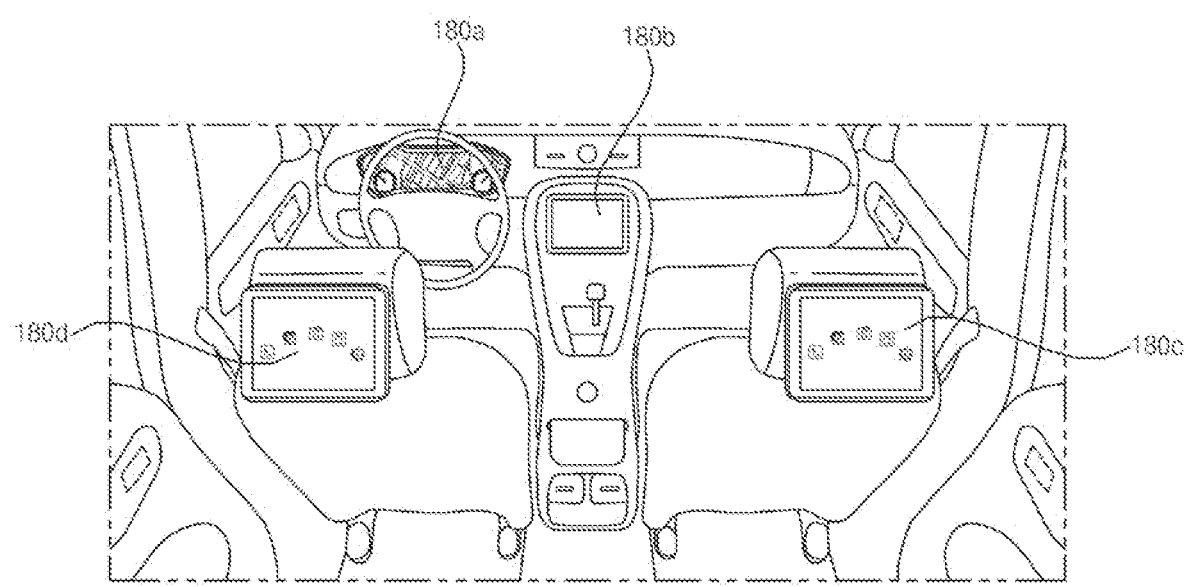
FIG. 4A is a diagram illustrating an example of an arrangement of a vehicle display apparatus in a vehicle according to an embodiment of the present disclosure.

FIG. 4A is a diagram illustrating an example of an arrangement of a vehicle display apparatus in a vehicle according to an embodiment of the present disclosure.

Referring to the figure, a cluster display 180a, an audio video navigation (AVN) display 180b, rear seat entertainment displays 180c and 180d, and a rear-view mirror display (not shown) may be mounted in the vehicle.

Figure 4B:
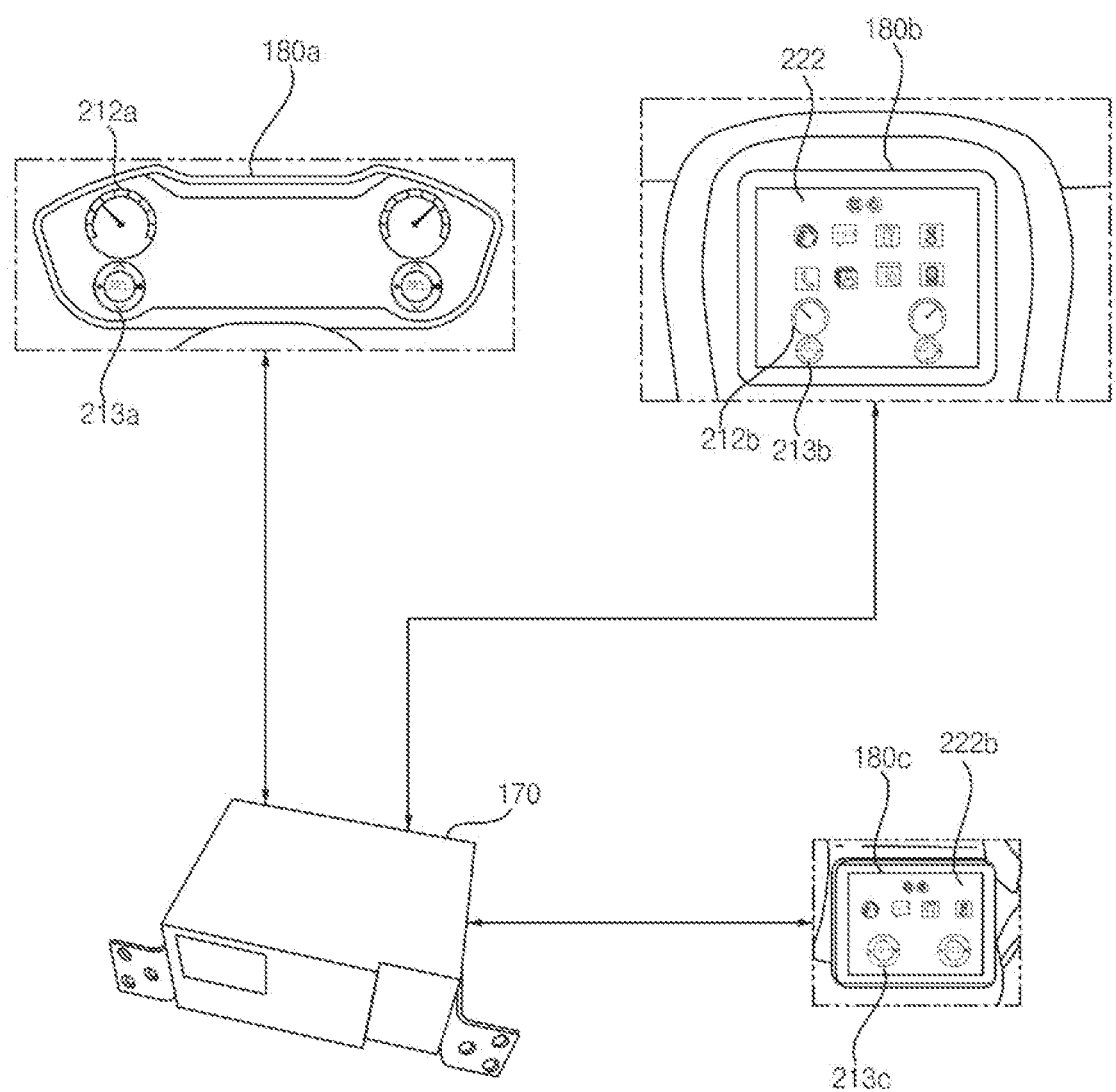
FIG. 4B is a diagram illustrating another example of an arrangement of a vehicle display apparatus in a vehicle according to an embodiment of the present disclosure.

FIG. 4B is a diagram illustrating another example of an arrangement of a vehicle display apparatus in a vehicle according to an embodiment of the present disclosure.

The vehicle display apparatus 100 according to the embodiment of the present disclosure may include a plurality of displays 180a and 180b and a signal processing device 170 configured to perform signal processing in order to display images and information on the plurality of displays 180a and 180b.

The first display 180a, which is one of the plurality of displays 180a and 180b, may be a cluster display 180a configured to display a driving state and operation information, and the second display 180b may be an audio video navigation (AVN) display 180b configured to display vehicle driving information, a navigation map, various kinds of entertainment information, or an image.

The signal processing device 170 may have a processor 175 provided therein, and first to third virtual machines (not shown) may be executed by a hypervisor 505 in the processor 175.

The second virtual machine (not shown) may be operated for the first display 180a, and the third virtual machine (not shown) may be operated for the second display 180b.

Meanwhile, the first virtual machine (not shown) in the processor 175 may be configured to set a shared memory 508 based on the hypervisor 505 for transmission of the same data to the second virtual machine (not shown) and the third virtual machine (not shown). Consequently, the first display 180a and the second display 180b in the vehicle may display the same information or the same images in a synchronized state.

Meanwhile, the first virtual machine (not shown) in the processor 175 shares at least some of data with the second virtual machine (not shown) and the third virtual machine (not shown) for divided processing of data. Consequently, the plurality of virtual machines for the plurality of displays in the vehicle may divide and process data.

Meanwhile, the first virtual machine (not shown) in the processor 175 may receive and process wheel speed sensor data of the vehicle, and may transmit the processed wheel speed sensor data to at least one of the second virtual machine (not shown) or the third virtual machine (not shown). Consequently, at least one virtual machine may share the wheel speed sensor data of the vehicle.

Meanwhile, the vehicle display apparatus 100 according to the embodiment of the present disclosure may further include a rear seat entertainment (RSE) display 180c configured to display driving state information, simple navigation information, various kinds of entertainment information, or an image.

The signal processing device 170 may further execute a fourth virtual machine (not shown), in addition to the first to third virtual machines (not shown), on the hypervisor 505 in the processor 175 to control the RSE display 180c.

Consequently, it is possible to control various displays 180a to 180c using a single signal processing device 170.

Meanwhile, some of the plurality of displays 180a to 180c may be operated based on a Linux Operating System (OS), and others may be operated based on a Web Operating System (OS).

The signal processing device 170 according to the embodiment of the present disclosure may be configured to display the same information or the same images in a synchronized state on the displays 180a to 180c to be operated under various operating systems.

Meanwhile, FIG. 4B illustrates that a vehicle speed indicator 212a and an in-vehicle temperature indicator 213a are displayed on the first display 180a, a home screen 222 including a plurality of applications, a vehicle speed indicator 212b, and an in-vehicle temperature indicator 213b is displayed on the second display 180b, and a second home screen 222b including a plurality of applications and an in-vehicle temperature indicator 213c is displayed on the third display 180c.

Figure 5:
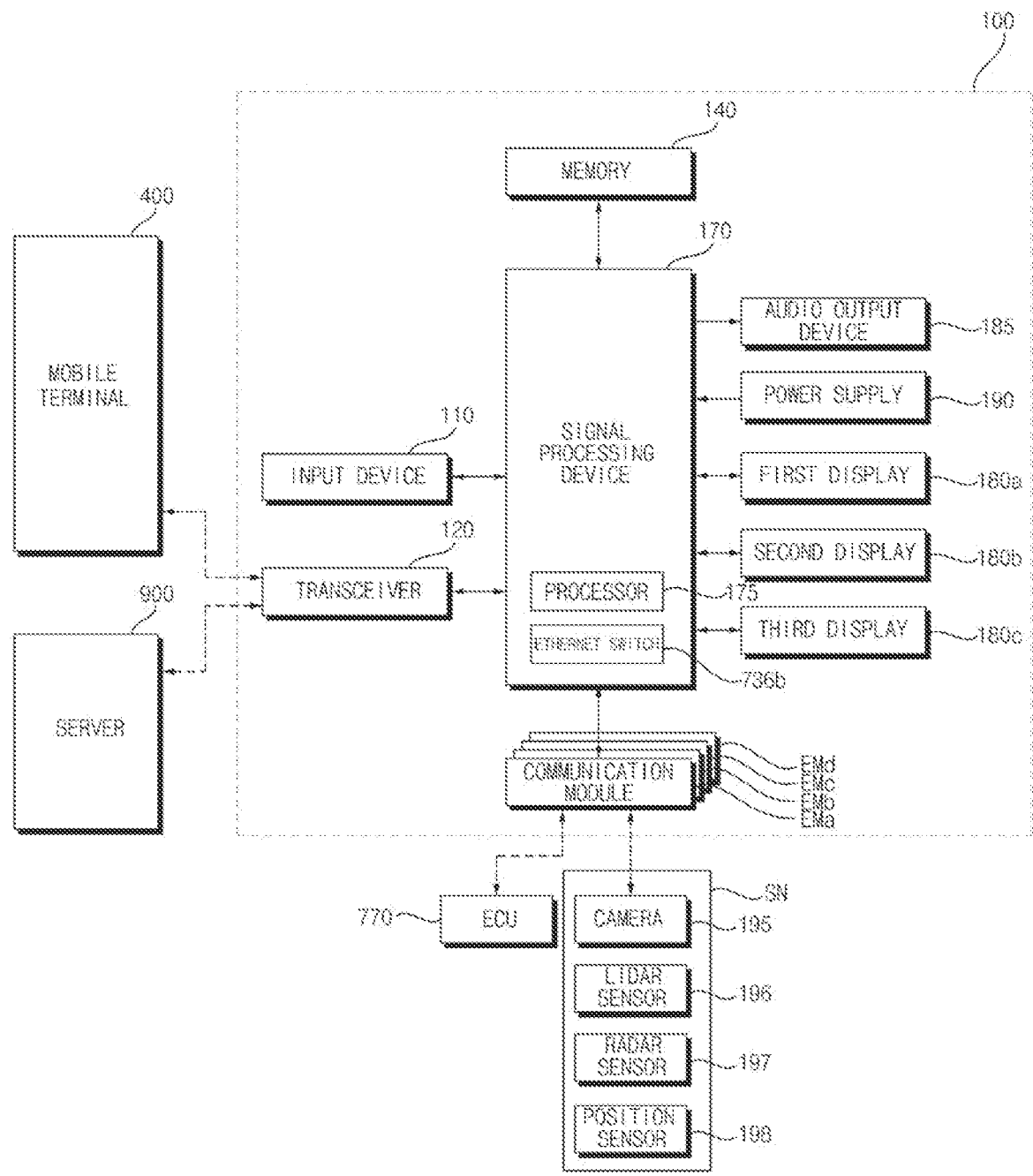
FIG. 5 is an internal block diagram illustrating the vehicle display apparatus of FIG. 4B.

FIG. 5 is an internal block diagram illustrating the vehicle display apparatus of FIG. 4B according to the embodiment of the present disclosure.

Referring to the figure, the vehicle display apparatus 100 according to the embodiment of the present disclosure may include an input device 110, a transceiver 120 for communication with an external device, a plurality of communication modules EMa to EMd for internal communication, a memory 140, a signal processing device 170, a plurality of displays 180a to 180c, an audio output device 185, and a power supply 190.

The plurality of communication modules EMa to EMd may be disposed in a plurality of zones Z1 to Z4, respectively, in FIG. 2A.

Meanwhile, the signal processing device 170 may be provided therein with an Ethernet switch 736b for data communication with the respective communication modules EM1 to EM4.

The respective communication modules EM1 to EM4 may perform data communication with a plurality of sensor devices SN or an ECU 770.

Meanwhile, each of the plurality of sensor devices SN may include a camera 195, a lidar sensor 196, a radar sensor 197, or a position sensor 198.

The input device 110 may include a physical button or pad for button input or touch input.

Meanwhile, the input device 110 may include a microphone (not shown) for user voice input.

The transceiver 120 may wirelessly exchange data with a mobile terminal 400 or a server 900.

In particular, the transceiver 120 may wirelessly exchange data with a mobile terminal of a vehicle driver. Any of various data communication schemes, such as Bluetooth, WiFi, WIFI Direct, and APIX, may be used as a wireless data communication scheme.

The transceiver 120 may receive weather information and road traffic situation information, such as transport protocol expert group (TPEG) information, from the mobile terminal 400 or the server 900. To this end, the transceiver 120 may include a mobile communication module (not shown).

The plurality of communication modules EM1 to EM4 may receive sensor information from an electronic control unit (ECU) 770 or a sensor device SN, and may transmit the received information to the signal processing device 170.

Here, the sensor information may include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, and in-vehicle humidity information.

The sensor information may be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor.

Meanwhile, the position module may include a GPS module configured to receive GPS information or a position sensor 198.

Meanwhile, at least one of the plurality of communication modules EM1 to EM4 may transmit position information data sensed by the GPS module or the position sensor 198 to the signal processing device 170.

Meanwhile, at least one of the plurality of communication modules EM1 to EM4 may receive front-of-vehicle image data, side-of-vehicle image data, rear-of-vehicle image data, and obstacle-around-vehicle distance information from the camera 195, the lidar sensor 196, or the radar sensor 197, and may transmit the received information to the signal processing device 170.

The memory 140 may store various data necessary for overall operation of the vehicle display apparatus 100, such as programs for processing or control of the signal processing device 170.

For example, the memory 140 may store data about the hypervisor and first to third virtual machines executed by the hypervisor in the processor 175.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control overall operation of each device in the vehicle display apparatus 100.

For example, the signal processing device 170 may include a processor 175 configured to perform signal processing for the vehicle displays 180*a* and 180*b*.

The processor 175 may execute the first to third virtual machines (not shown) on the hypervisor 505 (see FIG. 10) in the processor 175.

Among the first to third virtual machines (not shown) (see FIG. 10), the first virtual machine (not shown) may be called a server virtual machine, and the second and third virtual machines (not shown) and (not shown) may be called guest virtual machines.

For example, the first virtual machine (not shown) in the processor 175 may receive sensor data from the plurality of sensor devices, such as vehicle sensor data, position information data, camera image data, audio data, or touch input data, and may process and output the received sensor data.

As described above, the first virtual machine (not shown) may process most of the data, whereby 1:N data sharing may be achieved.

In another example, the first virtual machine (not shown) may directly receive and process CAN data, Ethernet data, audio data, radio data, USB data, and wireless communication data for the second and third virtual machines (not shown).

Further, the first virtual machine (not shown) may transmit the processed data to the second and third virtual machines (not shown).

Accordingly, only the first virtual machine (not shown), among the first to third virtual machines (not shown), may receive sensor data from the plurality of sensor devices, communication data, or external input data, and may perform signal processing, whereby load in signal processing by the other virtual machines may be reduced and 1:N data communication may be achieved, and therefore synchronization at the time of data sharing may be achieved.

Meanwhile, the first virtual machine (not shown) may be configured to write data in the shared memory 508, whereby the second virtual machine (not shown) and the third virtual machine (not shown) share the same data.

For example, the first virtual machine (not shown) may be configured to write vehicle sensor data, the position information data, the camera image data, or the touch input data in the shared memory 508, whereby the second virtual machine (not shown) and the third virtual machine (not shown) share the same data. Consequently, 1:N data sharing may be achieved.

Eventually, the first virtual machine (not shown) may process most of the data, whereby 1:N data sharing may be achieved.

Meanwhile, the first virtual machine (not shown) in the processor 175 may be configured to set the shared memory 508 based on the hypervisor 505 in order to transmit the same data to the second virtual machine (not shown) and the third virtual machine (not shown).

Meanwhile, the signal processing device 170 may process various signals, such as an audio signal, an image signal, and a data signal. To this end, the signal processing device 170 may be implemented in the form of a system on chip (SOC).

Figure 7:
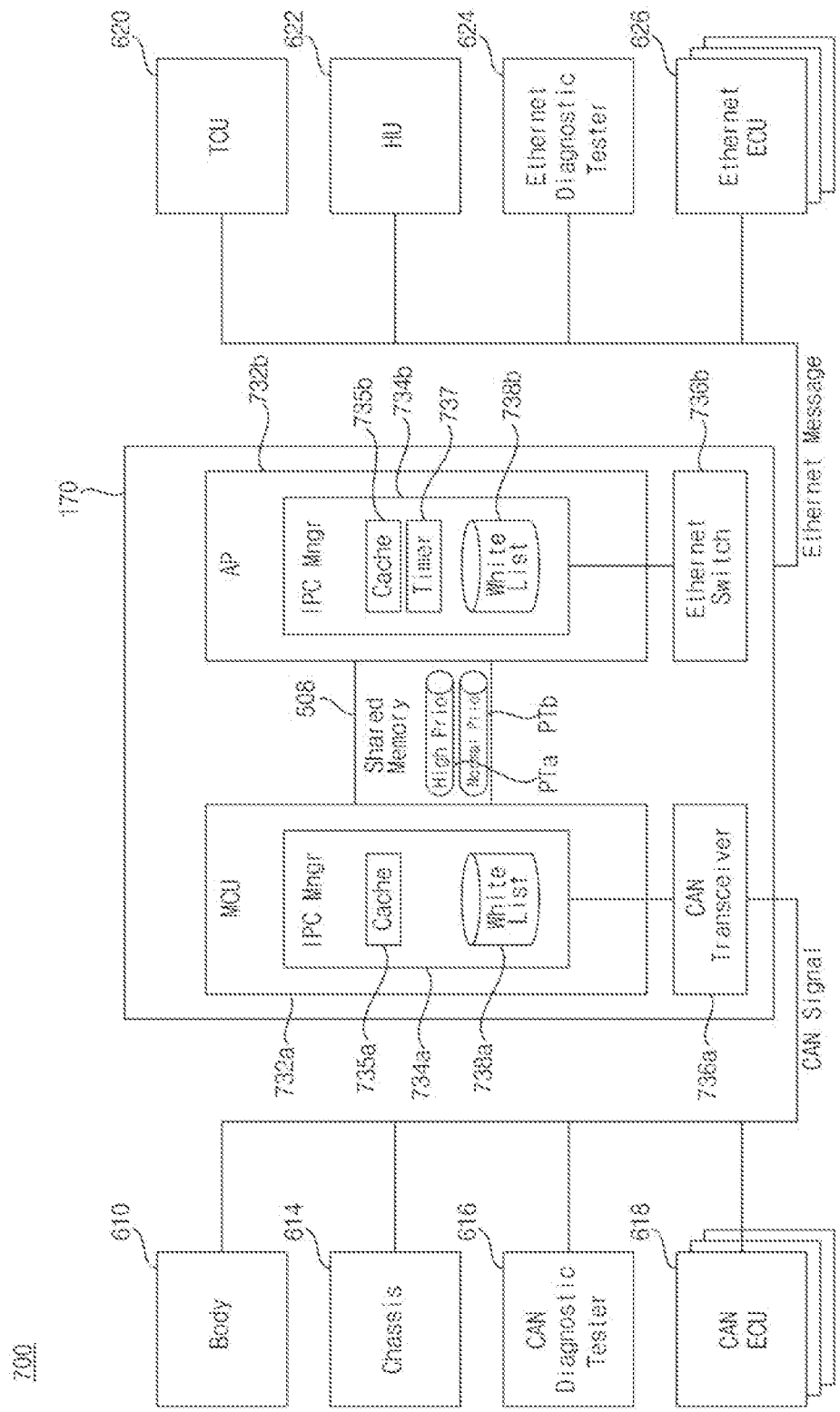
FIG. 7 is an internal block diagram illustrating a vehicle communication device according to an embodiment of the present disclosure.

Meanwhile, the signal processing device 170 included in the display apparatus 100 of FIG. 5 may be the same as the signal processing device 170 of a vehicle communication device 700 of FIG. 7 and the like.

Figure 6:
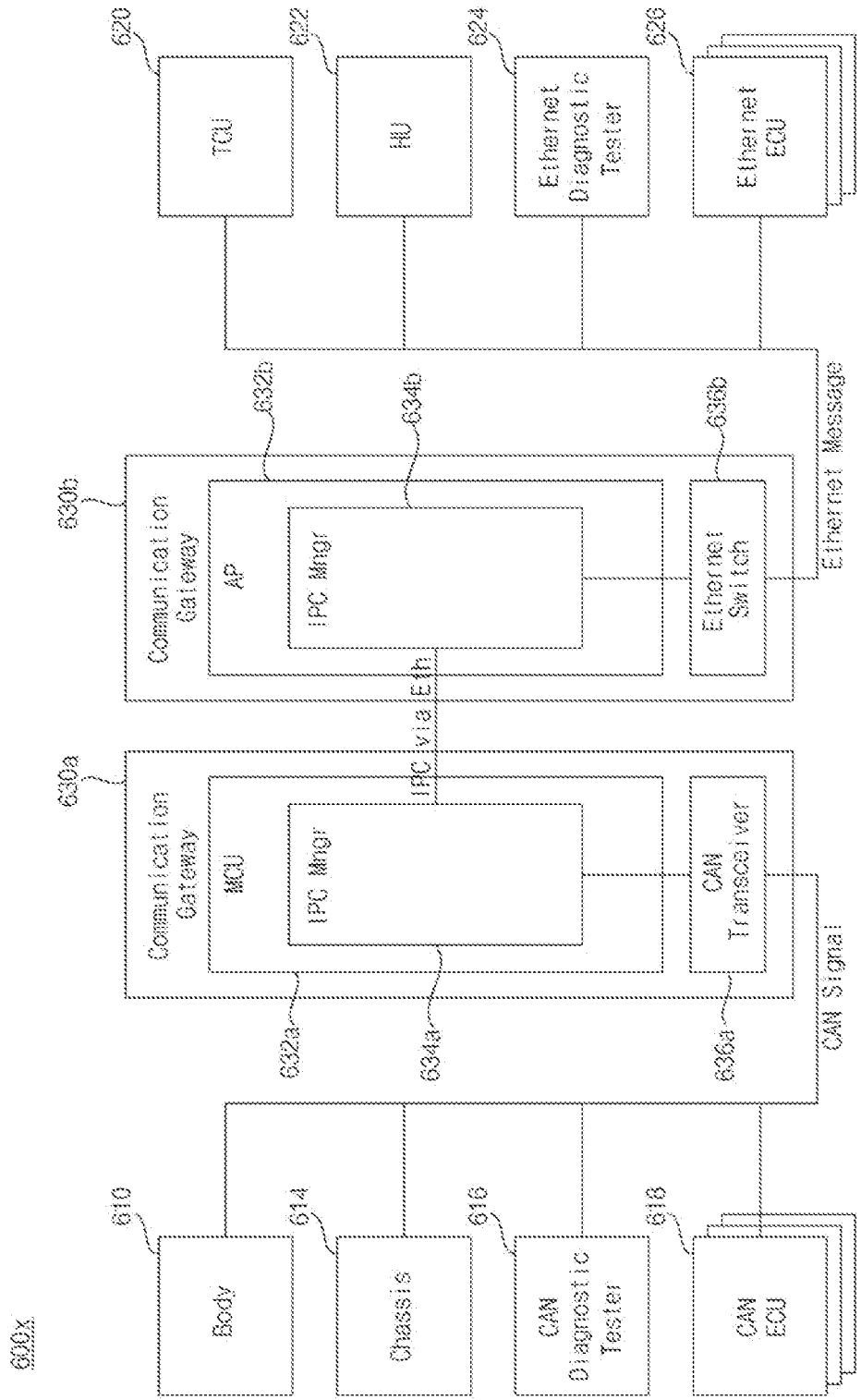
FIG. 6 is an internal block diagram illustrating a vehicle communication device associated with the present disclosure.

FIG. 6 is an internal block diagram illustrating a vehicle communication device associated with the present disclosure.

Referring to the drawing, a vehicle communication device 600*x* associated with the present disclosure may include a first communication gateway 630*a* and a second communication gateway 630*b*.

The first communication gateway 630*a* may include a body module 610, a chassis module 614, a CAN diagnostic tester 616, a CAN transceiver 636*a* for exchanging a CAN signal by CAN communication with at least one CAN ECU 618 and the like, and a first processor 632*a* for performing signal processing on the CAN signal received from the CAN transceiver 636*a*.

Meanwhile, the first processor 632*a* may include an IPC manager 634*a* for inter-processor communication with a second processor 632*b* in the second communication gateway 630*b*.

The second communication gateway 630*b* may include a telematics control module 620, a head module 622, an Ethernet diagnostic tester 624, an Ethernet switch 636*b* for exchanging an Ethernet message by Ethernet communication with at least one Ethernet ECU 626, and a second processor 632*b* for performing signal processing on the Ethernet message received from the Ethernet switch 636*b*.

Meanwhile, the second processor 632*b* may include an IPC manager 634*b* for inter-processor communication with the first processor 632*a* in the first communication gateway 630*a*.

Meanwhile, the IPC manager 634a in the first processor 632a and the IPC manager 643b in the second processor 632b may perform inter-processor communication based on the Ethernet communication.

While the inter-processor communication is suitable for high-speed transmission of large data using a high bandwidth based on Ethernet, the communication method has a drawback in that latency occurs in communication between a protocol stack and a Physical Layer (PHY).

Accordingly, the present disclosure provides a method of reducing latency and performing high-speed data transmission during inter-processor communication, which will be described below with reference to FIG. 7 and the following figures.

FIG. 7 is an internal block diagram illustrating a vehicle communication device according to an embodiment of the present disclosure.

Referring to the drawing, the vehicle communication device 700 according to an embodiment may include: a first processor 732a, which based on a first communication scheme along with a first communication gateway 730a and a second communication gateway 730b, is configured to receive a first message including a sensor signal in a vehicle and to perform signal processing on the received first message; a second processor 732b, which based a second communication scheme, is configured to receive a second message including a communication message received from an external source and to perform signal processing of the received second message; and a shared memory 508 configured to operate to transmit the first message or the second message between the first processor 732a and the second processor 732b.

In comparison with the communication device 600x of FIG. 6, by using the shared memory 508 for inter-processor communication (IPC) between the first processor 732a and the second processor 732b, it is possible to reduce latency and to perform high-speed data transmission during the inter-processor communication.

In addition, in comparison with the communication device 600x of FIG. 6, by providing the first processor 732a, the second processor 732b, and the shared memory 508 in one signal processing device 170 implemented as a single chip, it is possible to reduce latency and to perform high-speed data transmission during the inter-processor communication.

Meanwhile, it is preferred that the second communication scheme has a faster communication speed or a wider bandwidth than the first communication scheme.

For example, the second communication scheme may be Ethernet communication, and the first communication scheme may be CAN communication. Accordingly, the first message may be a CAN message, and the second message may be an Ethernet message.

Meanwhile, the signal processing device 170 and the vehicle communication device 700 including the same according to an embodiment of the present disclosure may further include: a transceiver 736a, which based on the first communication scheme, is configured to receive a first message including a sensor signal in a vehicle and to transmit the first message to the first processor 732a; and the switch 736b, which based on the second communication scheme, is configured to receive a second message including a communication message received from an external source, and to transmit the second message to the second processor 732b, such that the first and second messages may be transmitted stably to the first processor 732a and the second processor 732b.

The first processor 732a or the transceiver 736a may exchange a CAN signal by CAN communication with the body module 610, the chassis module 614, the CAN diagnostic tester 616, at least one CAN ECU 618, and the like.

Meanwhile, the first processor 732a may include a first manager 734a for inter-processor communication (IPC) with the second processor 732b. The first manager 734a may be referred to as an IPC manager.

Meanwhile, the first manager 734a may include a first cache 735a.

Meanwhile, the second processor 732b or the switch 736b may exchange an Ethernet message by Ethernet communication with the telematics control module 620, the head module 622, the Ethernet diagnostic tester 624, at least one Ethernet ECU 626, and the like. The switch 736b may be referred to as an Ethernet switch.

Meanwhile, the second processor 732b may include a second manager 734b for inter-processor communication (IPC) with the first processor 732a. The second manager 734a may be referred to as an IPC manager.

Meanwhile, the second manager 734b may include the second manager 734b including a second cache 735b and a timer 737.

Meanwhile, the second processor 723b may receive a request for periodic subscription to the first message from the Ethernet processor or the Ethernet ECU 626.

Accordingly, the second processor 732b may send the request for periodic subscription to the first message to the first processor 732a.

Particularly, the second processor 732b may transmit the subscription request through the inter-processor communication (IPC). Accordingly, the inter-processor communication may be performed.

Meanwhile, the first processor 732a may periodically receive CAN data from the at least one CAN ECU 618 and the like.

For example, the first processor 732a periodically receives the first message, predefined in a CAN database (DB), from the at least one CAN ECU 618 and the like.

For example, the periodic first message, which is sensor information, may include vehicle speed information, position information, or the like.

In another example, the periodic first message may include at least one of vehicle direction information, vehicle position information (GPS information), vehicle angle information, vehicle acceleration information, vehicle tilt information, forward/backward movement information, battery information, fuel information, tire information, vehicle lamp information, in-vehicle temperature information, and in-vehicle humidity information.

Meanwhile, the first processor 732a may select a first message, for which the subscription is requested, among the periodically received CAN data or first messages, and may transmit the first message, for which the subscription is requested, to the second processor 732b.

Meanwhile, the first processor 732a may separately process a first message, for which the subscription is not requested, among the periodically received CAN data or first messages, without transmitting the message to the second processor 732b.

Specifically, upon receiving the first message for which the subscription is requested, the first processor 732a may store the first message in the first cache 735a or may manage the first message. Upon receiving the first message, the first processor 732a may compare the first message with a value stored in the first cache 735a, and if a difference therebetween is greater than or equal to a predetermined value, the first processor 732a may transmit the first message to the second processor 732b through the inter-processor communication.

Meanwhile, upon receiving the first message for which the subscription is requested, the first processor 732a may store the first message in the first cache 735a or may manage the first message. Upon receiving the first message, the first processor 732a may compare the first message with a value stored in the first cache 735a, and if a difference therebetween is greater than or equal to a predetermined value, the first processor 732a may transmit the first message to the second processor 732b through the inter-processor communication using the shared memory 508.

For example, upon receiving the first message, the first processor 732a may compare the message with a value stored in the first cache 735a, and if the two are not the same, the first processor 732a may transmit the first message to the second processor 732b through the inter-processor communication using the shared memory 508.

In another example, upon receiving the first message, the first processor 732a may compare the message with the value stored in the first cache 735a, and if the two are the same, the first processor 732a may not transmit the first message to the second processor 732b.

Accordingly, by minimizing cache occupancy or buffer occupancy of the same data, it is possible to reduce latency and to perform high-speed data transmission during inter-processor communication.

Meanwhile, upon first receiving the first message, the second processor 732b may store the first message in the second cache 735b, and upon subsequently receiving the first message, the second processor 732b may update the second cache 735b. Accordingly, it is possible to reduce latency and to perform high-speed data transmission during inter-processor communication.

Meanwhile, upon receiving the first message, the second processor 732b may generate a thread of the timer 737, and each time the thread terminates, the second processor 732b may send a value in the second cache 735b to the Ethernet processor or the Ethernet ECU 626. Accordingly, it is possible to reduce latency and to perform high-speed data transmission during inter-processor communication.

Meanwhile, during a period in which the inter-processor communication is not performed such that the first message is not received, the second processor 732b may send a value in the second cache 735b to the Ethernet processor or the Ethernet ECU 626.

That is, if a value of the subscribed first message is constant during the period, the cache value stored in the second processor 732b may be sent to the Ethernet processor 626 without the inter-processor communication.

Accordingly, it is possible to minimize the usage of the IPC buffer in the shared memory 508 which operates in FIFO mode. In addition, by maintaining the usage of the IPC buffer to a minimum, data including the first message, the second message, or the like may be transmitted rapidly through the inter-processor communication.

Meanwhile, during a period in which the perform inter-processor communication such that the first message is received, the second processor 732b may send a value in the updated second cache 735b to the Ethernet processor or the Ethernet ECU 626. Accordingly, it is possible to reduce latency and to perform high-speed data transmission during inter-processor communication.

Meanwhile, during the inter-processor communication, the shared memory 508 may transmit data between the first processor 732a and the second processor 732b through a first queue PTb and a second queue PTa having a higher priority than the first queue PTb.

Particularly, even when the number of events for the inter-processor communication increases, the shared memory 508 may transmit only the data, corresponding to events allocated for the second queue PTa, through the second queue PTa. Accordingly, real-time transmission of a high priority event may be ensured during the inter-processor communication.

For example, the first PTb may be a normal priority queue, and the second queue PTa may be a high priority queue.

Specifically, the shared memory 508 may transmit most of the data through the first queue PTb during the inter-processor communication.

However, the share memory 508 may transmit only time sensitive-critical data without delay through the second queue PTa which is a higher priority queue than the first queue PTb.

For example, the time sensitive-critical data may be speed data, position information data, or the like.

That is, the shared memory 508 may transmit the speed data or position information data between the first processor 732a or the second processor 732b through the second queue PTa. Accordingly, real-time transmission of the speed data or the position information data having a high priority may be ensured during the inter-processor communication.

Meanwhile, the first processor 732a or the second processor 732b may manage a list of applications capable of using the second queue PTa.

For example, the second processor 732b may include an application for displaying speed information, as an application capable of using the second queue PTa, in a second list 738b and may manage the list.

Meanwhile, for real-time transmission through the second queue PTa, a minimum operation is preferred so that there may be no redundant scenarios or applications.

As described above, by transmitting the time sensitive-critical data in real time using the second queue PTa, real-time transmission of a high priority event may be ensured during the inter-processor communication.

Meanwhile, during the inter-processor communication, the shared memory 508 may reduce latency and may perform high-speed data transmission by assigning at least two queues.

In the drawing, an example is illustrated in which the first manager 734a in the first processor 732a manages a first list 738a which is a whitelist, and the second manager 734b in the second processor 732b manages a second list 738b which is a whitelist, thereby ensuring the real-time transmission of a high-priority event during the inter-processor communication.

Figure 8:
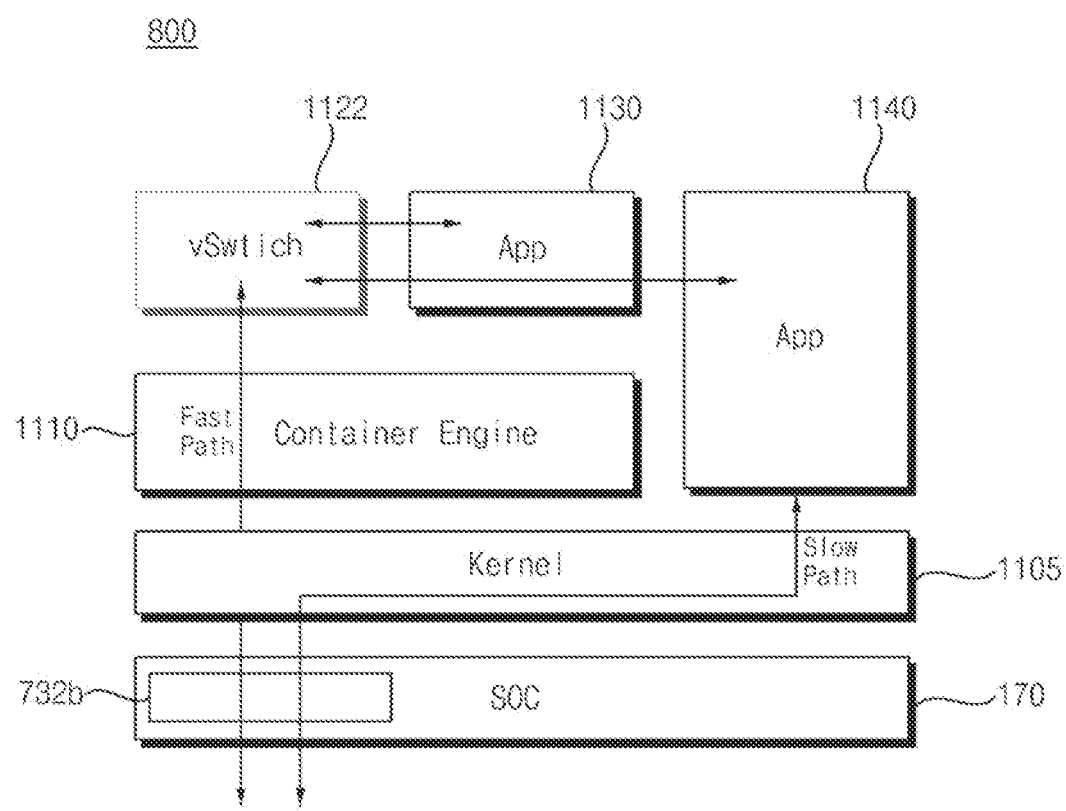
FIG. 8 is a diagram illustrating an example of a system for operating a vehicle communication device according to an embodiment of the present disclosure.

FIG. 8 is a diagram illustrating an example of a system for operating a vehicle communication device according to an embodiment of the present disclosure.

Referring to the drawing, an operating system of a vehicle communication device 800 according to an embodiment of the present disclosure includes: the processor 732b configured to receive network data from an external source and to process the received network data; and a signal processing device 170 including the shared memory 508 configured to store data received from the processor 732b.

The signal processing device 170 in the vehicle communication device 800 according to an embodiment of the present disclosure is configured to execute a network switch 1122 on a container engine 1110, and in response to a request for transmission of the network data from executed containers 1130 and 1140, the signal processing device 170 is configured to transmit the network data through a first path (Fast Path) which is based on the network switch 112 and the shared memory 508, or to transmit the network data through a second path (Slow Path) which is based on an interface in the containers 1130 and 1140. Accordingly, network data processing performance may be improved. Further, specific network data may be rapidly processed and transmitted.

Meanwhile, the processor 732b in the signal processing device 170 is configured to: execute a kernel 1105 and execute a container engine 1110 on the kernel 1105; execute the network switch 1122 on the container engine 1110; receive the network data based on Ethernet communication; and in response to a request for transmission of the network data from the containers 1130 and 1140 executed on the container engine 1110 or the kernel 1105, to transmit the network data through the first path (Fast Path) which is based on the network switch 1122 and the shared memory 508, or transmit the network data through the second path (Slow Path) which is based on the kernel 1105 and an Ethernet interface 1134 in the containers 1130 and 1140.

In the drawing, an example is illustrated in which the signal processing device 170 includes the processor 732b which is implemented in the form of a system on chip (SoC), and the kernel 1105 is executed in the processor 732b, and the container engine 1110 executes on the kernel 1105.

Meanwhile, as illustrated herein, the processor 732b may execute a first container 1130 and the network switch 1122 for efficient network data processing on the container engine 1110, and may execute a second container 1140 on the kernel 1105.

Meanwhile, unlike the drawing, a second application 114 or the second container may execute on the container engine 1110, as in the first application 1130 or the first container.

The first path (Fast Path) is a path for faster network data processing than the second path (Slow Path), and as illustrated herein, the network data may be transmitted to the first container 1130 or the second container 1140 via the container engine 1110 and the network switch 112.

Particularly, based on the first path (Fast Path), the network data may be transmitted to the first container 1130 or the second container 1140 through the shared memory 508 via the network switch 1122. Accordingly, data transmission is performed through the shared memory 508, instead of UART, SPI, Ethernet communication, etc., thereby allowing the network data to be transmitted in real time with high bandwidth and throughput.

Meanwhile, the second path (Slow Path) is a path for slower network data processing than the first path (Fast Path), and as illustrated herein, the network data may be transmitted to the second container 1140 and the like via the kernel 1105.

Particularly, based on the second path (Slow Path), the network data is transmitted to the second container 1140 and the like through Ethernet communication.

As described above, by using a plurality of paths for network data transmission to the first container 1130 or the second container 1140, network data processing performance may be improved. Further, specific network data may be rapidly processed.

Meanwhile, the processor 732b and the shared memory 508 may correspond to the second processor 732b and the memory 508, respectively, in FIG. 7.

Meanwhile, in response to a request for transmission of the network data based on the first path (Fast Path) from the container 1103 or 1140, the processor 732b may perform updating to set up the first path (Fast Path) which is based on the network switch 112 and the shared memory 508. Accordingly, network data processing performance may be improved. Particularly, network data processing performance may be dynamically improved based on updating.

Meanwhile, during monitoring of transmission of the network data through the second path (Slow Path), if an amount of the transmitted network data is greater than or equal to an allowable value, the processor may to transmit the network data through the first path (Fast Path). Accordingly, network data processing performance may be improved. Particularly, it is possible to improve network data processing performance when an amount of the transmitted network data is greater than or equal to an allowable value.

Meanwhile, in response to a request for transmission of a first network data from a first container 1130 to operate for driving the first display 180a, the processor 732b may to transmit the first network data through the second path (Slow Path), and in response to a request for transmission of a second network data from the second container 1140 or a second application 1130 and 1140 to operate for driving the second display 180b, the processor 732b may to transmit the second network data through the first path (Fast Path).

For example, if a resolution of the second display 180b is greater than a resolution of the first display 180a, the processor 732b may to transmit the first network data through the second path (Slow Path) and transmit the second network data through the first path (Fast Path). Accordingly, network data processing performance may be improved. Particularly, by processing the network data using different paths for each display, network data processing performance may be improved.

In another example, if a resolution of the second network data is greater than a resolution of the first network data, the processor 732b may to transmit the first network data through the second path (Slow Path) and transmit the second network data through the first path (Fast Path). Accordingly, high-resolution network data processing performance may be improved.

Meanwhile, during transmission of the network data through the second path (Slow Path), if a data amount of the network data increases to a reference value or higher, the processor may to transmit the network data through the first path (Fast Path). Accordingly, it is possible to improve network data processing performance when an amount of network data is greater than or equal to a reference value.

Meanwhile, during transmission of the network data through the second path (Slow Path), if a network address of the network data is changed, the processor 732b may to transmit the network data through the first path (Fast Path).

For example, while the processor 732b receives streaming data having a first resolution as network data from a first external server and transmits the network data through the second path (Slow Path), if a network address of the network data is changed from the first server to a second server, such that the processor 732b receives streaming data having a second resolution, greater than the first resolution, as network data, the processor 732b may to transmit the network data through the first path (Fast Path). Accordingly, it is possible to improve network data processing performance when a network address of the network data is changed.

Specifically, while the network switch 1122 implemented on the processor 732b transmits the network data to the container 1130 or 1140 through the second path (Slow Path), if the network address is changed from 10.100.20.30, which is a network IP address of the first server, to 10.100.20.40 which is a network IP address of the second server, the network switch 1122 may transmit the network data to the container 1130 or 1140 through the first path (Fast Path). Accordingly, it is possible to improve network data processing performance when a network address of the network data is changed.

Then, the network switch 1122 implemented on the processor 732*b* may continuously transmit the network data to the container 1130 or 1140 through the first path (Fast Path).

Figure 9:
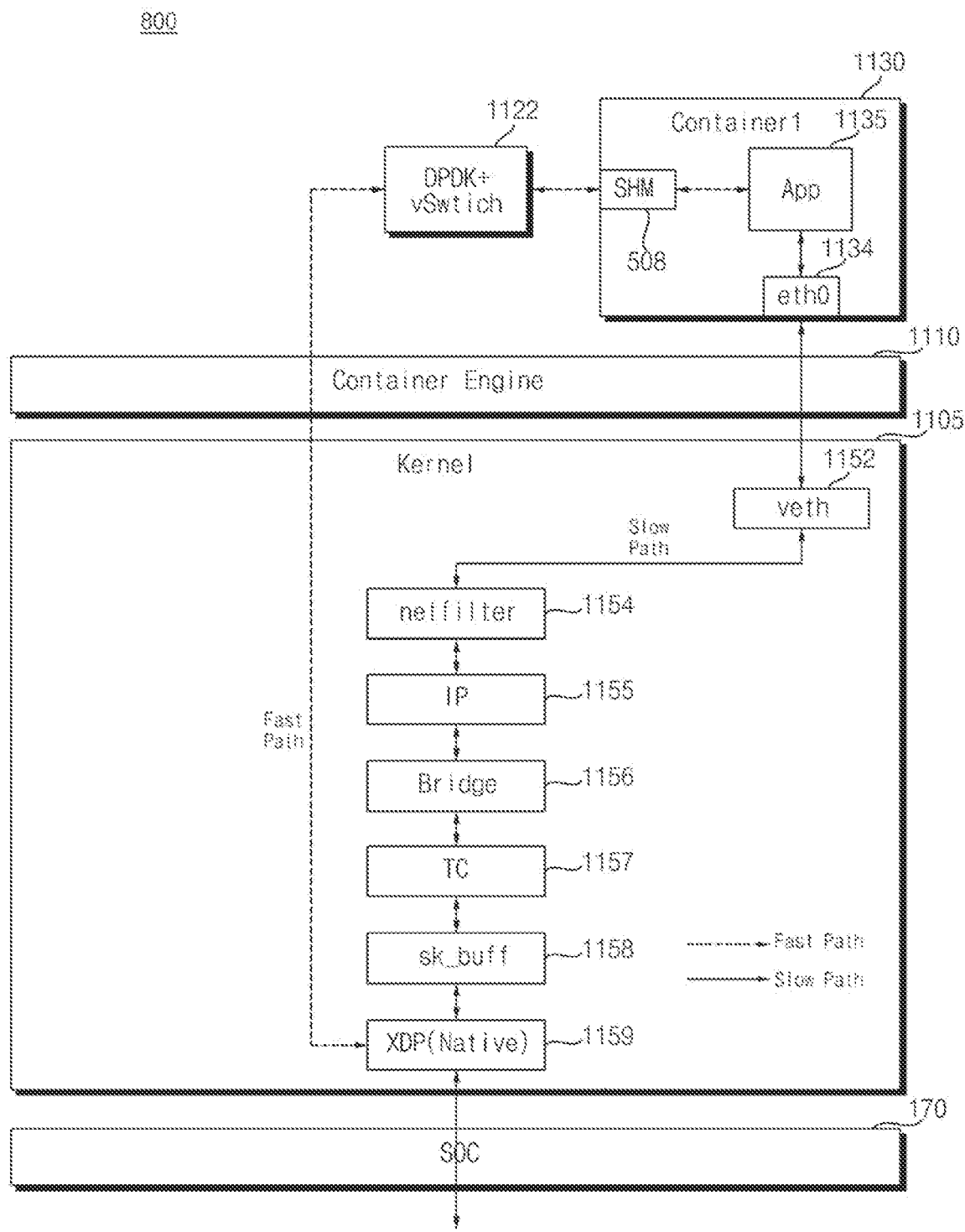
FIGS. 9 and 10 are diagrams referred to in the description of FIG. 8.
Figure 10:
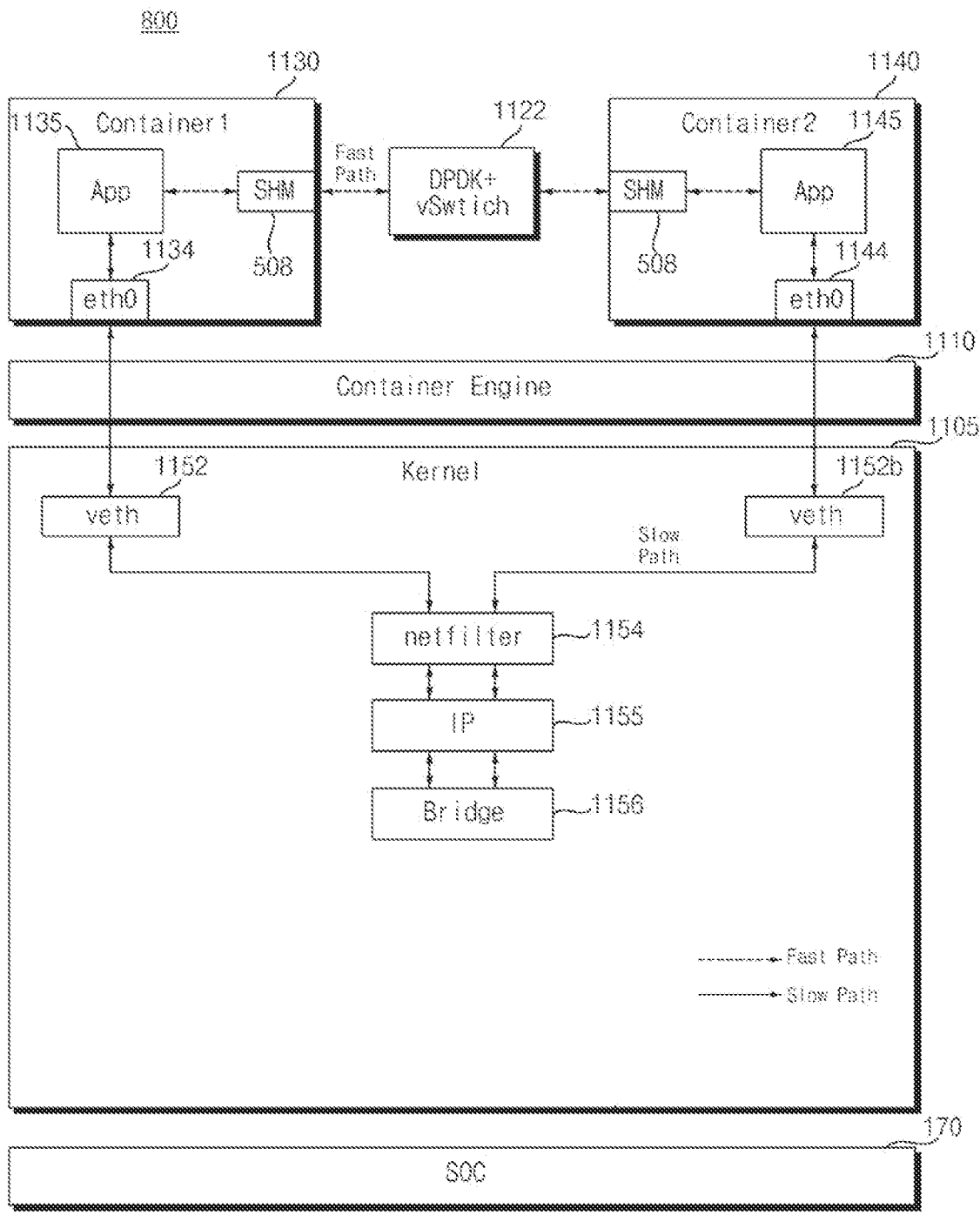

FIGS. 9 and 10 are diagrams referred to in the description of FIG. 8.

FIG. 9 is a diagram illustrating an example of transmitting network data from an external network interface 501 to the container 1130.

Referring to the drawing, the processor 732*b* in the signal processing device 170 according to an embodiment of the present disclosure executes the kernel 1105.

Meanwhile, the kernel 1105 may execute a physical driver 1159 for receiving network data from the network interface 501, a socket buffer 1158, a traffic control 1157, a bridge 1156, an IP 1155, a net filter 1154, and an Ethernet interface 1152.

Meanwhile, the kernel 1105 may transmit network data, received by the physical driver 1159, to the network switch 1122 through the first path (Fast Path).

Specifically, the kernel 1105 may transmit network data, received by the physical driver 1159, directly to the network switch 1122 without passing through the socket buffer 1158 and the like.

Further, the network switch 1122 may transmit the network data to the controller 1130 by using the shared memory 508. Accordingly, the network data may be rapidly processed through the first path (Fast Path).

Meanwhile, FIG. 9 illustrates an example in which the shared memory 508 is included in the container 1130, but unlike FIG. 9, the shared memory 508 may be provided separately from the processor 732*b* as in FIG. 7.

Meanwhile, the kernel 1105 may transmit the network data, received by the physical driver 1159, to the Ethernet interface 1134 in the containers 1130 and 1140 through the second path (Slow Path) via the bridge 1156, the IP 1155, the net filter 1154, and the Ethernet interface 1152. Accordingly, data may be processed differently for each path.

FIG. 10 is a diagram illustrating an example of data transmission between the containers of FIG. 8.

Referring to the drawing, during transmission of first data from the first container 1130 to the second container 1140, the first data may be transmitted through the first path (Fast Path) by using the shared memory 508. Accordingly, the first data may be rapidly transmitted from the first container 1130 to the second container 1140.

Meanwhile, during transmission of the first data from the first container 1130 to the second container 1140, the kernel 1105 may receive the first data from a first Ethernet interface 1134 in the first container 1130 through the Ethernet interface 1152, and may transmit the first data to a second Ethernet interface 1144 in the second container 1140 via the bridge 1156, the IP 1155, the net filter 1154, and an Ethernet interface 1152*b* without passing through the physical driver 1159, the socket buffer 1158, and the traffic control 1157.

Specifically, during transmission of the first data from the first container 1130 to the second container 1140, the kernel 1105 may transmit the first data to the second Ethernet interface 1144 in the second container 1140 via the Ethernet interface 1152, the net filter 1154, the IP 1155, the bridge 1156, the IP 1155, the net filter 1154, and the Ethernet interface 1152*b*. Accordingly, network data may be efficiently transmitted between the containers through various paths.

Meanwhile, in the signal processing device 170 of the vehicle communication device 800 of FIGS. 8 to 10, the processor 732*b* may process the network data, received from an external server 900 and the like, and may transmit the processed data to the containers and the like.

Meanwhile, as illustrated in FIG. 6, the signal processing device 170 according to an embodiment of the present disclosure may further include a first processor 732*a* configured to receive an in-vehicle sensor signal based on CAN communication, and the second processor 732*b* receives the network data based on Ethernet communication, in which inter-processor communication may be performed for data communication between the second processor 732*b* and the first processor 732*a*.

As described above, by performing inter-processor communication using the shared memory 508 during communication between the plurality of processors 732*b* and 732*a*, latency may be reduced and high-speed data transmission may be performed during the inter-processor communication.

Meanwhile, the shared memory 508 may operate for message transmission between the processor 732*b* and the processor 732*a*. Accordingly, latency may be reduced and high-speed data transmission may be performed during the inter-processor communication.

Figure 11:
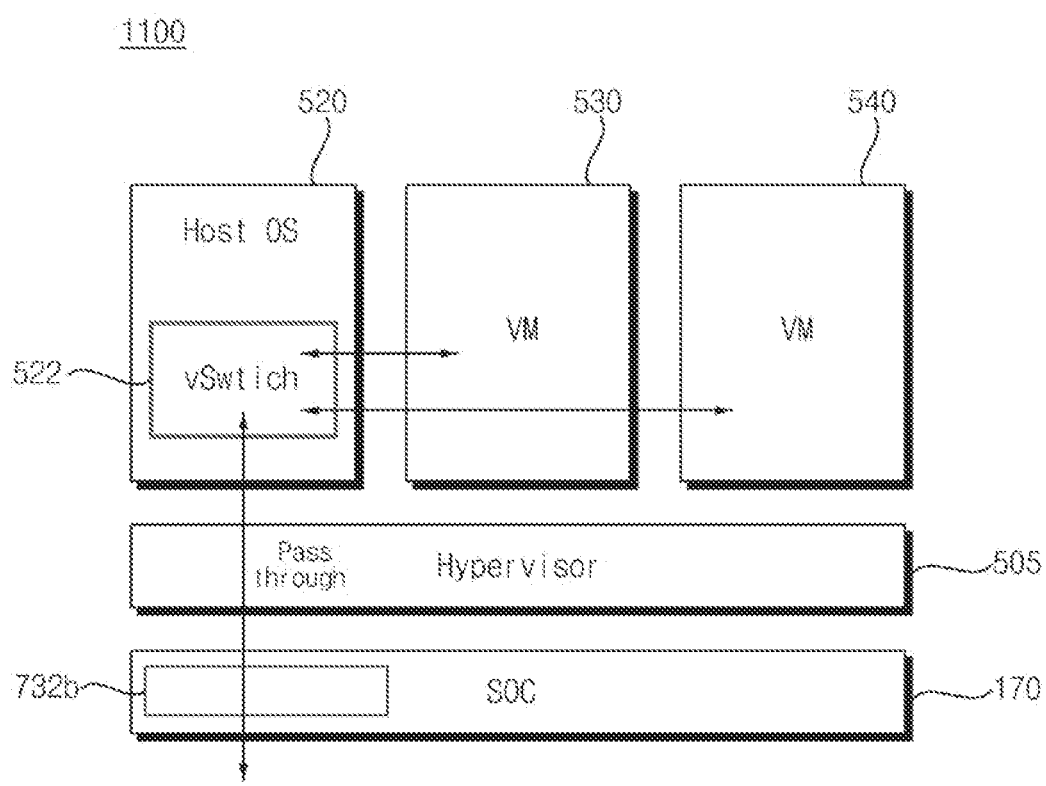
FIG. 11 is a diagram illustrating another example of a system for operating a vehicle communication device according to an embodiment of the present disclosure.

FIG. 11 is a diagram illustrating another example of a system for operating a vehicle communication device according to an embodiment of the present disclosure.

Referring to the drawing, an operating system of a vehicle communication device 1100 according to an embodiment of the present disclosure includes: the processor 732*b* configured to receive network data from an external source and process the received network data; and the signal processing device 170 including the shared memory 508 configured to store data received from the processor 732*b*.

The processor 732 in the vehicle communication device 1100 according to an embodiment of the present disclosure may execute the hypervisor 505 and execute the network switch 1122 on the hypervisor 505.

Meanwhile, the processor 732*b* in the signal processing device 170 may execute a plurality of virtual machines 530 and 540 on the hypervisor 505.

For example, a first virtual machine 530 may be a virtual machine for the first display 180*a*, and a second virtual machine 540 may be a virtual machine for the second display 180*b*.

Meanwhile, the processor 732*b* in the signal processing device 170 may execute a host OS on the hypervisor 505, and may execute the network switch 522 on the host OS 520.

Meanwhile, in response to a request for transmission of network data from the virtual machines 530 and 540 executed on the hypervisor 505, the processor 732*b* in the signal processing device 170 performs control to transmit the network data to the virtual machines 530 and 540 through a path based on the network switch 522 and the shared memory 508.

Accordingly, network data processing performance may be improved. Particularly, network data may be efficiently transmitted to the virtual machines 530 and 540.

Meanwhile, during transmission of the network data to the virtual machines 530 and 540, the network switch 522 may allow the hypervisor 505 to pass through. Accordingly, network data processing performance may be improved.

Meanwhile, the processor 732b and the shared memory 508 of FIG. 8 may correspond to the second processor 732b and the memory 508, respectively, in FIG. 7.

FIGS. 12 to 15 are diagrams referred to in the description of FIG. 11.

Figure 12:
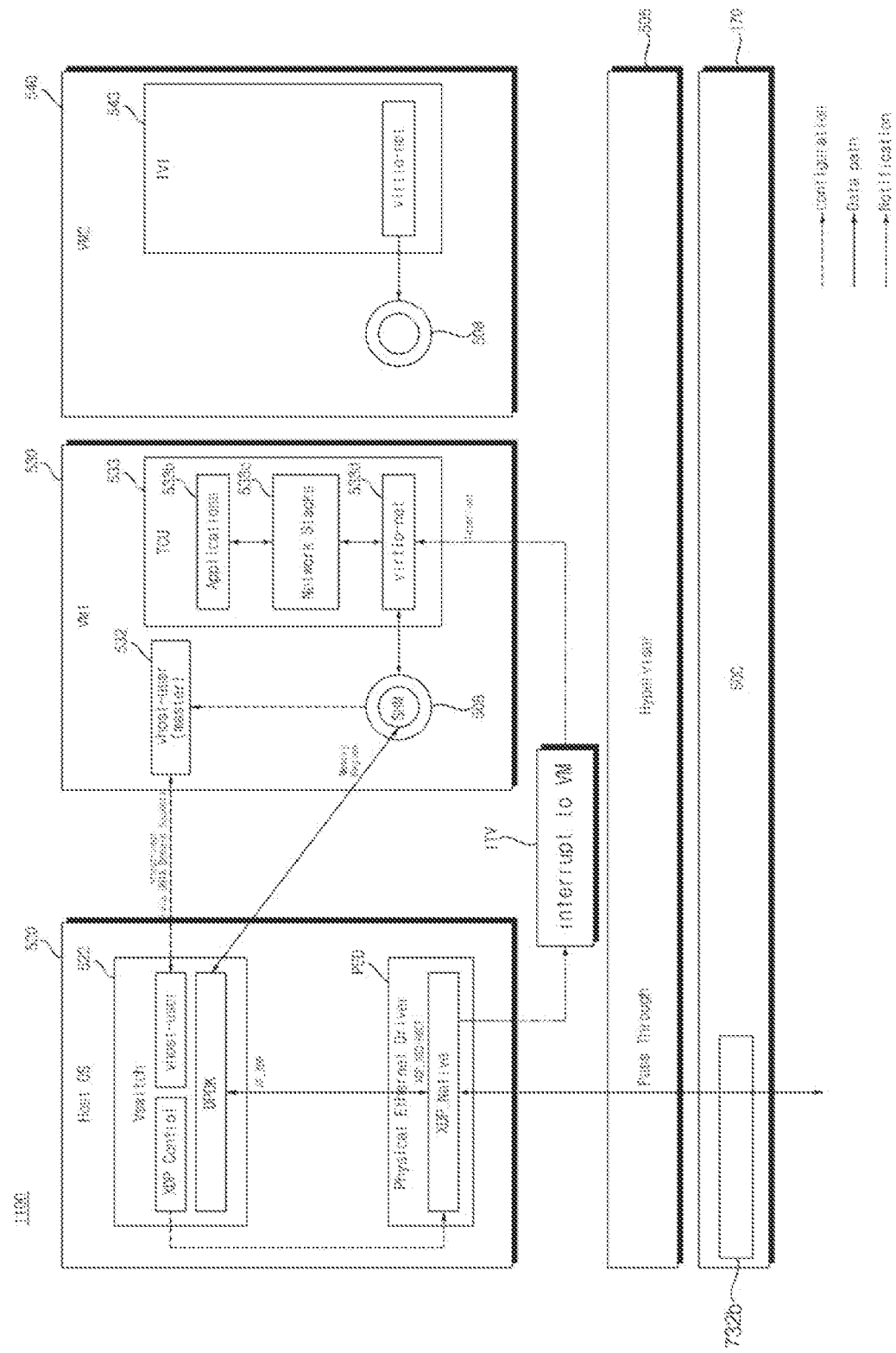
FIGS. 12 to 15 are diagrams referred to in the description of FIG. 11.

FIG. 12 is a diagram illustrating in further detail an operation system of the vehicle communication device 1100.

Referring to the drawing, the processor 732b may further execute a physical driver PED that receives network data from the network interface 501.

Particularly, the processor 732b may further execute the physical driver PED separately from the network switch 522 in the host OS 520.

Meanwhile, the processor 732b may to transmit the network data, received from an external source, to the virtual machines 530 and 540 via the physical driver PED, the network switch 522, and the shared memory 508. Accordingly, network data processing performance may be improved.

Meanwhile, the physical driver PED may send a notification about the network data to drivers in the virtual machines 530 and 540 by using an interrupt signal. Accordingly, network data processing performance may be improved.

Specifically, if the physical driver PED receives the network data, the processor 732b transmits an interrupt signal to an interrupt handler ITV, and the interrupt handler ITV may transmit the interrupt signal to a driver (virtio-net) 533d in the virtual machines 530 and 540.

The network data is transmitted from the network switch 522 to the shared memory 508 based on the interrupt signal, and the network data may be transmitted from the shared memory 508 to the driver (virtio-net) 533d.

The network data received by the driver (virtio-net) 533d may be transmitted to an application 533, executed in the virtual machine 530, via a network stack 533c.

Figure 13A:
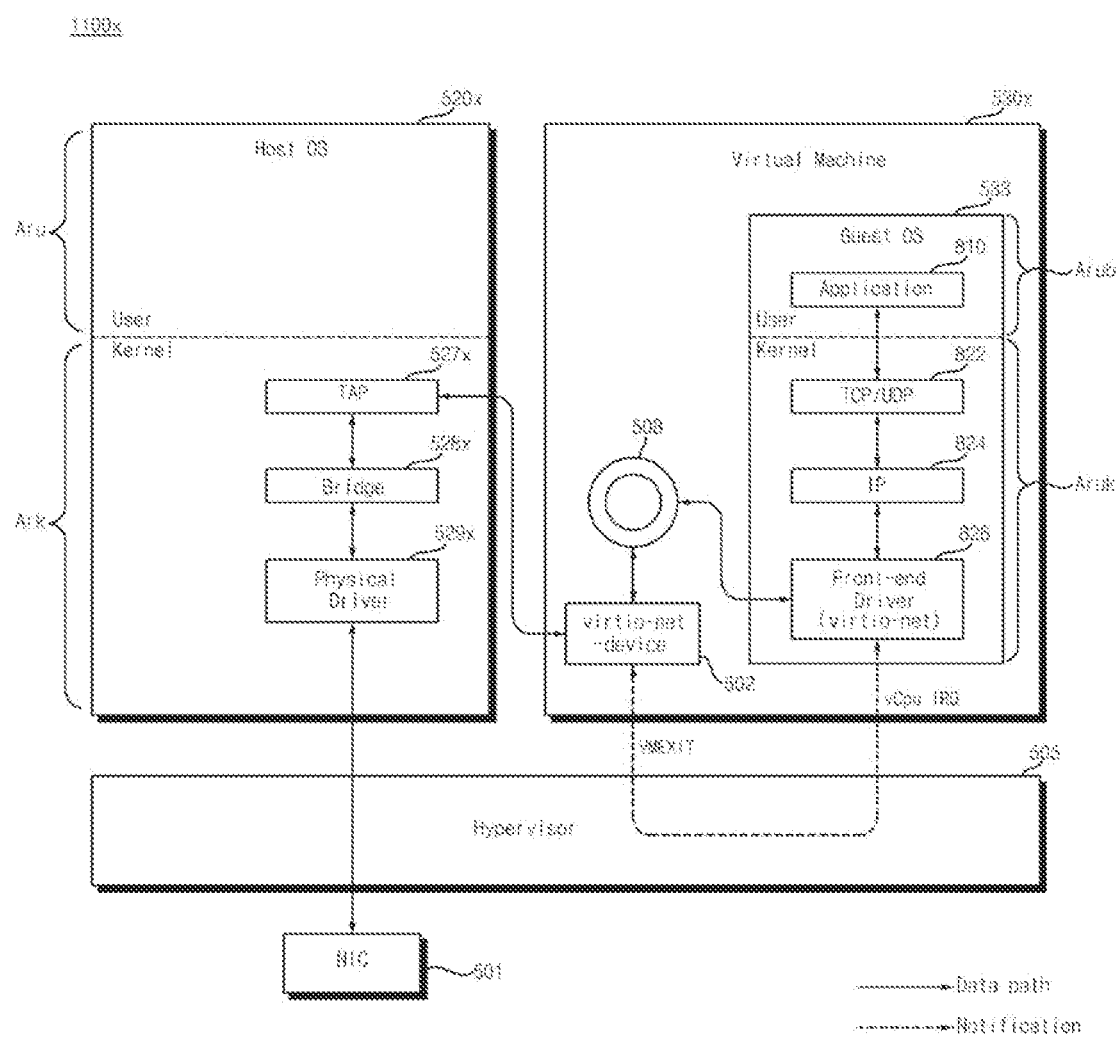

FIG. 13A is a diagram illustrating network data transmission in a virtual machine related to the present disclosure.

Referring to the drawing, in a vehicle communication device 1100x related to the present disclosure, network data is transmitted using a physical driver 529x with no network switch 522 included in the host OS 520.

As illustrated herein, the physical driver 529x may receive the network data from the network interface 501, and the network data may be transmitted to the application 522 via a bridge 528x, a TAP 527x, a driver (virtio-net device) 502, the shard memory 508, a driver (virtio-net) 826, an IP 824, and a TCP/UDP 822.

In this manner, the network data is transmitted to an application 810 through many steps.

Figure 13B:
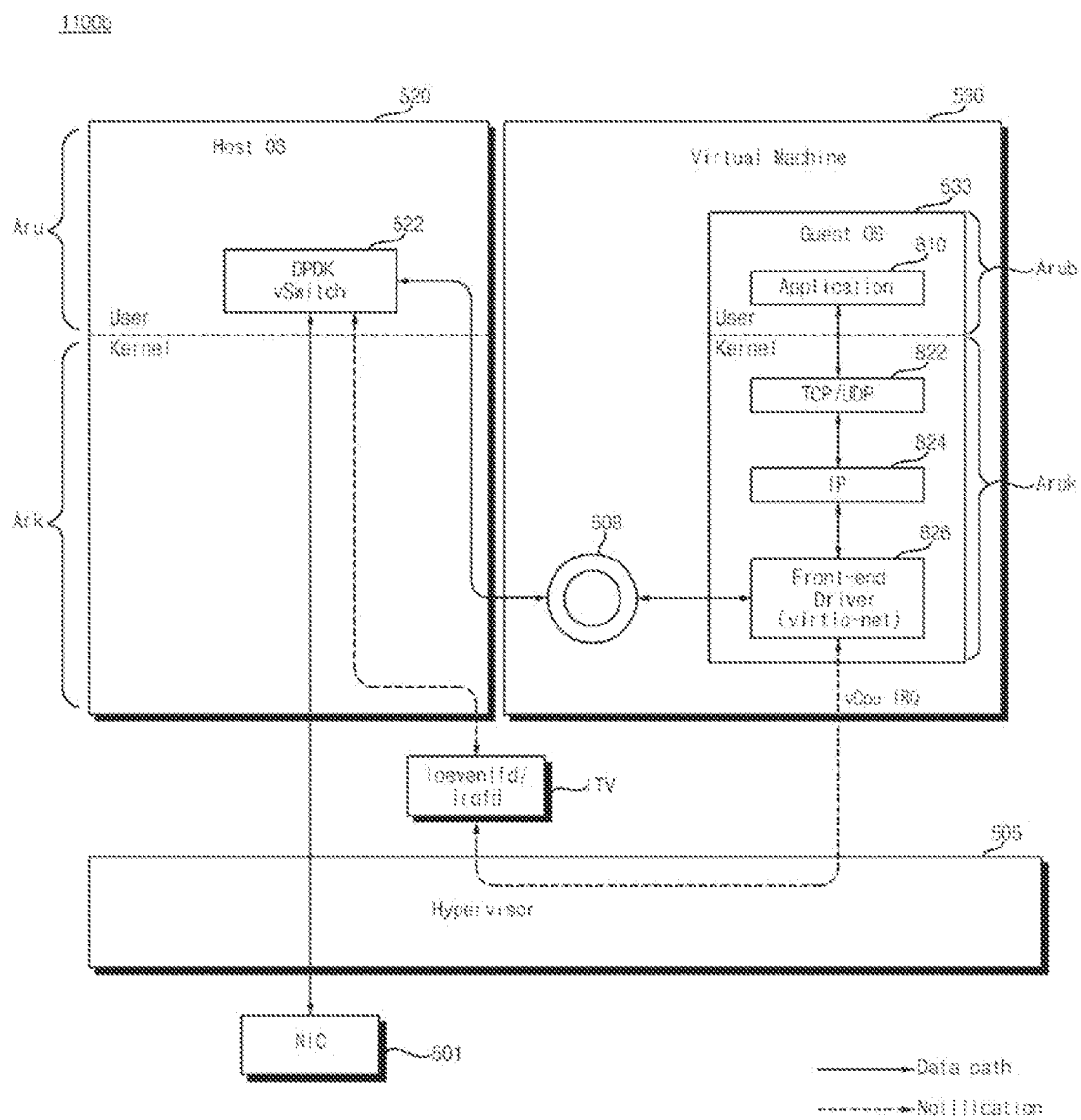

FIG. 13B is a diagram illustrating network data transmission in a virtual machine according to an embodiment of the present disclosure.

Referring to the drawing, the signal processing device 170 in the vehicle communication device 1100 related to the present disclosure executes the network switch 522 on the host OS 520, and the network switch 522 receives network data directly from the network interface 510.

Further, when receiving the network data, the network switch 522 may transmit an interrupt signal to the interrupt handler ITV, and the interrupt handler ITV may transmit the interrupt signal to the driver (virtio-net) 826 in the virtual machine 530.

The network data may be transmitted from the network switch 522 to the shared memory 508 based on the interrupt signal, and the network data may be transmitted from the shared memory 508 to the driver (virtio-net) 826.

The network data received by the driver (virtio-net) 826 may be transmitted to the application 810 via the IP 824 and the TCP/UDP 822.

As described above, network data may be rapidly transmitted by using the shared memory 508 and the interrupt signal.

Figure 14:
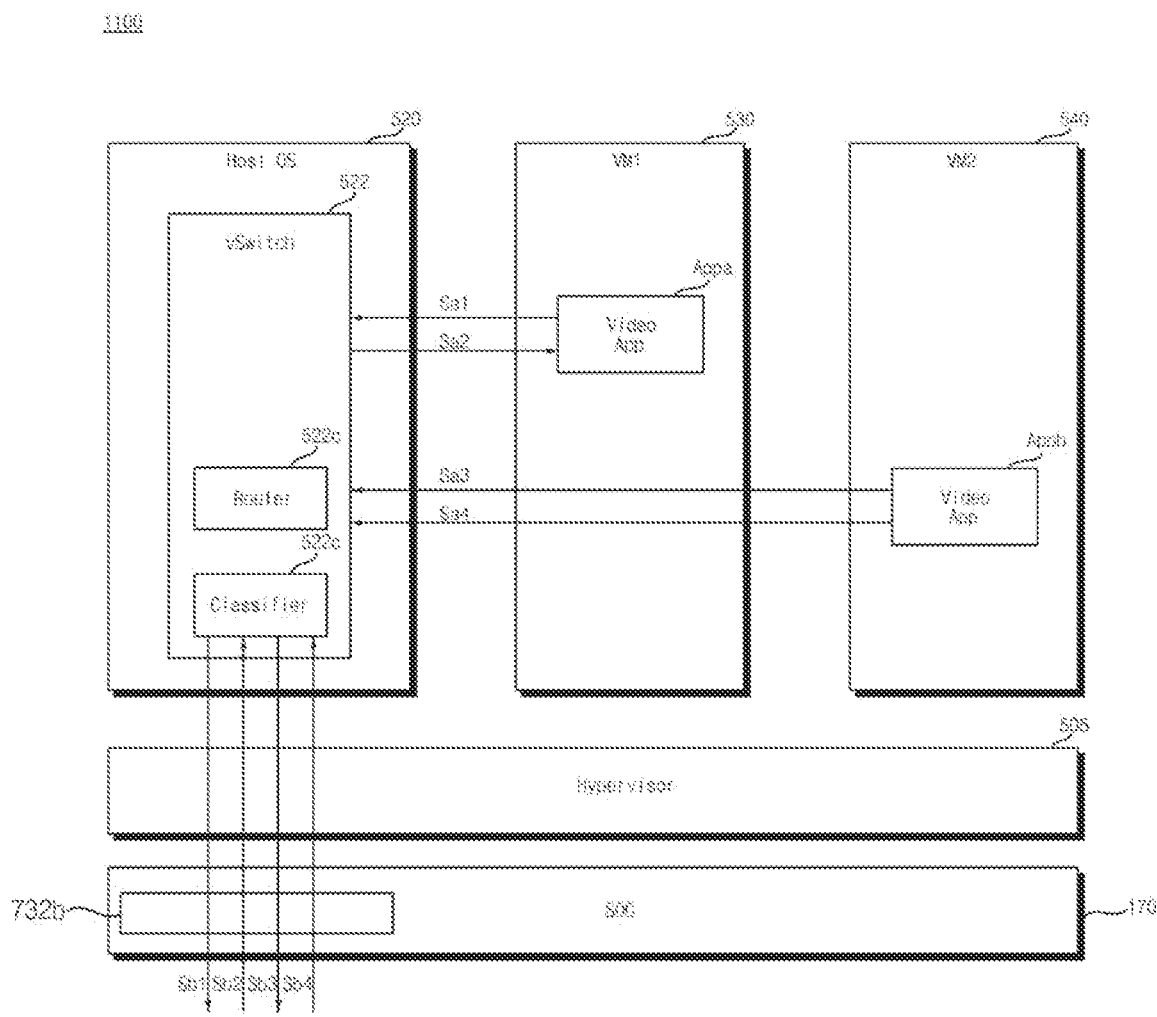

FIG. 14 is a diagram illustrating an example of transmitting network data to a plurality of virtual machines.

Referring to the drawing, the processor 732b in the signal processing device 170 may execute the plurality of virtual machines 530 and 540 and the host OS 520 on the hypervisor 505.

For example, the first virtual machine 530 may be a virtual machine for the first display 180a, and a second virtual machine 540 may be a virtual machine for the second display 180b.

Referring to the drawing, if the first virtual machine 530 transmits a request for image data having a first resolution to the network switch 522 (Sa1), the network switch 522 transmits the request for the image data having the first resolution to an external server 900 and the like (Sb1), and upon receiving the image data having the first resolution from the external server 900 and the like (Sb2), the network switch 522 may transmit the image data having the first resolution to the first virtual machine 520 by using the shared memory 508 and the like (Sa2).

Meanwhile, if the second virtual machine 540 transmits a request for image data having a second resolution to the network switch 522 (Sa3), the network switch 522 transmits the request for the image data having the second resolution to the external server 900 and the like (Sb3), and upon receiving the image data having the second resolution from the external server 900 and the like (Sb4), the network switch 522 may transmit the image data having the second resolution to the second virtual machine 540 by using the shared memory 508 and the like (Sa2).

Specifically, the network switch 522 implemented on the processor 732b may receive the image data having the first resolution at 10.100.20.30, which is a network IP address of the first server, and may transmit the image data having the first resolution to the first virtual machine 530.

Meanwhile, the network switch 522 implemented on the processor 732b may receive the image data having the second resolution at 10.100.20.40, which is a network IP address of the second server, and may transmit the image data having the second resolution to the second virtual machine 540.

Accordingly, image data having different resolutions may be efficiently transmitted to the respective virtual machines 530 and 540, and thus images suitable for the displays 180a and 180b having different resolutions may be displayed.

Figure 15:
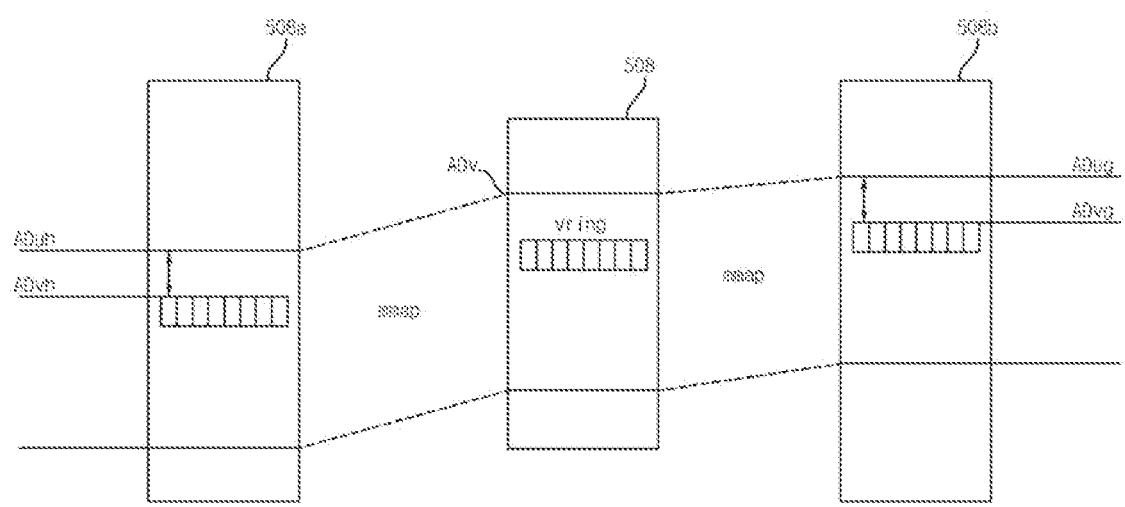

FIG. 15 is a diagram illustrating a configuration of the shared memory 508.

Referring to the drawing, if a shared memory 508b is allocated or created by the virtual machine 530, the virtual machine 530 transmits a file descriptor (fd) of a shared memory to the network switch 522.

The network switch 522 in the host OS maps the shared memory based on the received filter descriptor (fd).

Accordingly, actual address information ADug and virtual address information ADVg of the shared memory 508b of the virtual machine 530 may be mapped to actual address information ADug and virtual address information ADVg of the shared memory 508a of the network switch 522.

Meanwhile, in the signal processing device 170 of the vehicle communication device 1100 of FIGS. 11 to 15, the processor 732b may process the network data received from the external server 900 and the like, and may transmit the processed data to a container and the like.

Meanwhile, as illustrated in FIG. 6, the signal processing device 170 according to an embodiment of the present disclosure may further include the first processor 732a configured to receive an in-vehicle sensor signal based on CAN communication, and the second processor 732b receives network data based on Ethernet communication, in which inter-processor communication may be performed for data communication between the second processor 732b and the first processor 732a.

As described above, by performing inter-processor communication using the shared memory 508 during communication between the plurality of processors 732b and 732a, latency may be reduced and high-speed data transmission may be performed during the inter-processor communication.

Meanwhile, the shared memory 508 may operate for message transmission between the processor 732b and the processor 732a. Accordingly, latency may be reduced and high-speed data transmission may be performed during the inter-processor communication.

Figure 16:
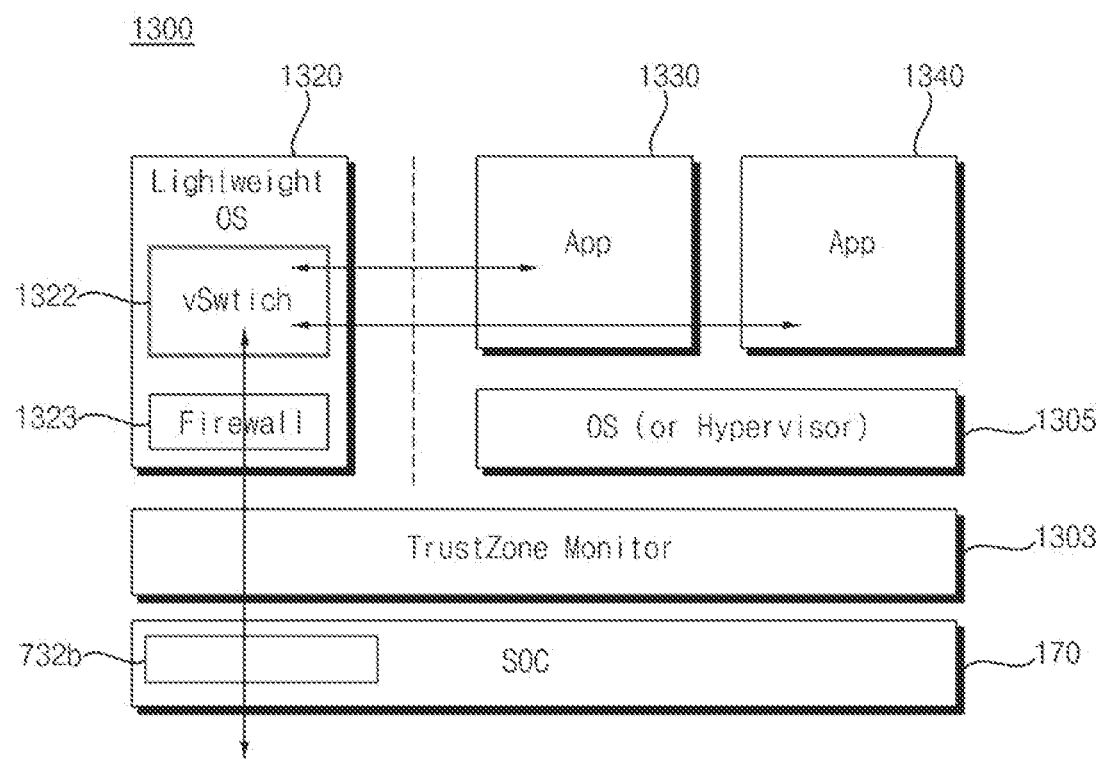
FIG. 16 is a diagram illustrating yet another example of a system for operating a vehicle communication device according to an embodiment of the present disclosure.

FIG. 16 is a diagram illustrating yet another example of a system for operating a vehicle communication device according to an embodiment of the present disclosure.

Referring to the drawing, an operating system of a vehicle communication device 1300 according to an embodiment of the present disclosure includes: the processor 732b configured to receive network data from an external source, and to process the received network data; and the signal processing device 170 including the shared memory 508 configured to store data received from the processor 732b.

Meanwhile, the processor 732b may implement a network switch 1322, and upon receiving a request for transmission of network data from applications 1330 and 1340 executed on the hypervisor 1305, the processor 732b performs control to transmit the network data to the applications 1330 and 1340 through a path based on the network switch 1322 and the shared memory 508. Accordingly, network data processing performance may be improved. Further, specific network data may be rapidly processed and transmitted.

Meanwhile, the processor 732b may implement a TrustZone monitor 1303 and may execute an OS 1320 or an operating system or a hypervisor 1305 on the TrustZone monitor 1303.

Meanwhile, the network switch 1322 and a firewall 1323 may be implemented in the OS 1320.

In this vehicle communication device 1300, network data is transmitted to the applications 1330 and 1340 through a path based on the network switch 522 and the shared memory 508, such that network data processing performance may be improved.

Figure 17:
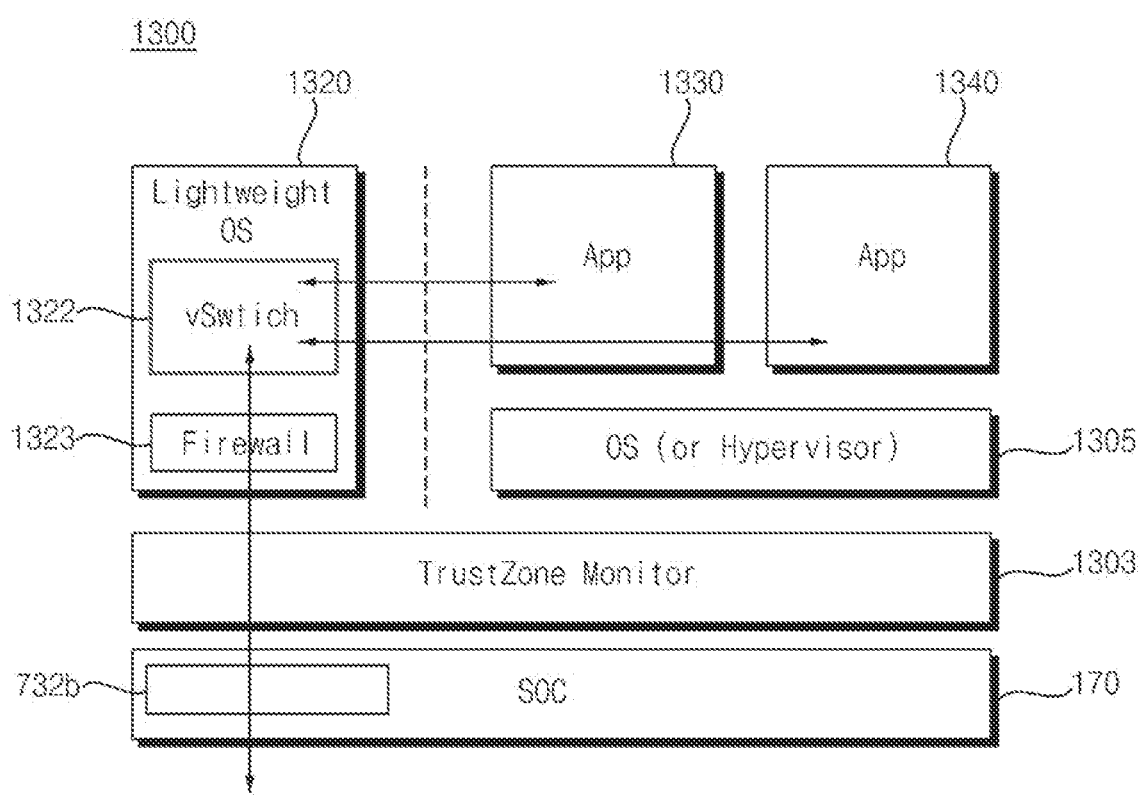
FIG. 17 is a diagram illustrating further another example of a system for operating a vehicle communication device according to an embodiment of the present disclosure.

FIG. 17 is a diagram illustrating further another example of a system for operating a vehicle communication device according to an embodiment of the present disclosure.

Referring to the drawing, an operating system of a vehicle communication device 1400 according to an embodiment of the present disclosure includes: the processor 732b configured to receive network data from an external source and process the received network data; and the signal processing device 170 including the shared memory 508 configured to store data received from the processor 732b.

Meanwhile, the processor 732b executes a kernel 1405 and executes a network switch 1422 and applications 1430 and 1440 on the kernel 1405, and in response to a request for transmission of network data from the applications 1430 and 1440, the processor 732b performs control to transmit the network data to the applications 1430 and 1440 through a path based on the network switch 1422 and the shared memory 508.

In this case, the kernel 1405 may transmit the network data to the network switch 522 through bypassing.

Accordingly, network data processing performance may be improved. Further, specific network data may be rapidly processed and transmitted.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A signal processing device comprising:
  a processor configured to receive network data from an external source and to process the received network data; and
  a shared memory configured to store data received from the processor,
  wherein the processor is configured to:
  execute a network switch on a container engine, and
  in response to a request for transmission of the network data from an executed container, transmit the network data through a first path based on the network switch and the shared memory, or transmit the network data through a second path based on an interface in the container, and
  wherein the processor is configured to:
  in response to a request for transmission of a first network data from a first application or a first container to operate for driving a first display, transmit the first network data through the second path, and
  in response to a request for transmission of a second network data from a second application or a second container to operate for driving a second display, transmit the second network data through the first path.

2. The signal processing device of claim 1, wherein the processor is configured to:
  execute a kernel and execute a container engine on the kernel;
  execute the network switch on the container engine;
  receive the network data based on Ethernet communication; and
  in response to a request for transmission of the network data from the container executed on the container engine or the kernel, transmit the network data through the first path based on the network switch and the shared memory, or transmit the network data through the second path based on the kernel and an Ethernet interface in the container.

3. The signal processing device of claim 2, wherein the kernel is configured to:
  execute a physical driver to receive the network data from a network interface, and
  transmit the network data, received by the physical driver, to the network switch based on the first path, or transmit the network data, received by the physical driver, to the Ethernet interface in the container via a bridge, an IP, a net filter, and an Ethernet interface based on the second path.

4. The signal processing device of claim 2, wherein the kernel is configured to:

execute a physical driver to receive the network data from a network interface, and transmit the network data, received by the physical driver, to the network switch based on the first path, or transmit the network data, received by the physical driver, to the Ethernet interface in the container via a socket buffer, a traffic control, a bridge, an IP, a net filter, and an Ethernet interface based on the second path.

5. The signal processing device of claim 4, wherein during transmission of first data from the first container to the second container, the kernel is configured to:

transmit the first data by using the shared memory through the first path; or receive the first data from a first Ethernet interface through the second path, and transmit the first data to the second container via the bridge, the IP, the net filter, and the Ethernet interface, without passing through the physical driver, the socket buffer, and the traffic control.

6. The signal processing device of claim 1, wherein in response to a request for transmission of the network data from the container based on the first path, the processor is configured to set up the first path based on the network switch and the shared memory.

7. The signal processing device of claim 1, wherein during monitoring of transmission of the network data through the second path, in response to an amount of the transmitted network data being greater than or equal to an allowable value, the processor is configured to transmit the network data through the first path.

8. The signal processing device of claim 1, wherein a resolution of the second display is greater than a resolution of the first display, or a resolution of the second network data is greater than a resolution of the first network data.

9. The signal processing device of claim 1, wherein in response to a data amount of the network data increasing to a reference value or higher during transmission of the network data through the second path, the processor is configured to transmit the network data through the first path.

10. The signal processing device of claim 1, wherein in response to a network address of the network data being changed during transmission of the network data through the second path, the processor is configured to transmit the network data through the first path.

11. The signal processing device of claim 1, further comprising a second processor configured to receive an in-vehicle sensor signal based on CAN communication, wherein the processor is configured to:

receive the network data based on an Ethernet communication, and perform inter-processor communication for communication between the processor and the second processor.

12. The signal processing device of claim 11, wherein the shared memory is configured to operate for message transmission between the processor and the second processor.

13. A signal processing device comprising:

a processor configured to receive network data from an external source and to process the received network data; and a shared memory configured to store data received from the processor, wherein the processor is configured to:

execute a hypervisor and execute a network switch on the hypervisor, and in response to a request for transmission of the network data from a virtual machine executed on the hypervisor, transmit the network data to the virtual machine through a path based on the network switch and the shared memory, and wherein the processor is configured to:

in response to a request for transmission of a first network data from a first virtual machine to operate for driving a first display, transmit the first network data having a first resolution, and in response to a request for transmission of a second network data from a second virtual machine to operate for driving a second display, transmit the second network data having a second resolution.

14. The signal processing device of claim 13, wherein during transmission of the network data to the virtual machine, the network switch controls the hypervisor to pass through.

15. The signal processing device of claim 13, wherein the processor is configured to further execute a physical driver to receive the network data from a network interface, and wherein the processor is configured to transmit the network data to the virtual machine via the physical driver, the network switch, and the shared memory.

16. A signal processing device comprising:

a processor configured to receive network data from an external source and to process the received network data; and a shared memory configured to store data received from the processor, wherein the processor is configured to execute a network switch, wherein in response to a request for transmission of the network data from an application executed on an operating system or a hypervisor, the processor is configured to transmit the network data to the application through a path based on the network switch and the shared memory, and wherein the processor is configured to:

in response to a request for transmission of a first network data from a first application to operate for driving a first display, transmit the first network data having a first resolution, and in response to a request for transmission of a second network data from a second application to operate for driving a second display, transmit the second network data having a second resolution.

17. A signal processing device comprising:

a processor configured to receive network data from an external source and to process the received network data; and a shared memory configured to store data received from the processor, wherein the processor is configured to:

execute a kernel and execute a network switch and an application on the kernel, and in response to a request for transmission of the network data from the application, transmit the network data to the application through a path based on the network switch and the shared memory, and wherein the processor is configured to:

in response to a request for transmission of a first network data from a first application to operate for driving a first display, transmit the first network data having a first resolution, and in response to a request for transmission of a second network data from a second application to operate for driving a second display, transmit the second network data having a second resolution.

18. A vehicle communication device comprising a signal processing device,
wherein the signal processing device comprises:
a processor configured to receive network data from an external source and to process the received network data; and
a shared memory configured to store data received from the processor,
wherein the processor is configured to:
execute a network switch on a container engine, and
in response to a request for transmission of the network data from an executed container, transmit the network data through a first path based on the network switch and the shared memory, or transmit the network data through a second path based on an interface in the container, and
wherein the processor is configured to:
in response to a request for transmission of a first network data from a first application to operate for driving a first display, transmit the first network data having a first resolution, and
in response to a request for transmission of a second network data from a second application to operate for driving a second display, transmit the second network data having a second resolution.

* * * * *